US012692162B2

(12) United States Patent
Ding et al.

(10) Patent No.: US 12,692,162 B2
(45) Date of Patent: Jul. 28, 2026

(54) DISPERSIONS CONTAINING GRAPHENIC CARBON NANOPARTICLES AND DISPERSANT RESINS

(71) Applicant: PPG Industries Ohio, Inc., Cleveland, OH (US)

(72) Inventors: Qi Ding, Allison Park, PA (US); Michael J. Pawlik, Glenshaw, PA (US); Caitlyn B. Neidig, Gibsonia, PA (US); Cynthia Kutchko, Pittsburgh, PA (US); Larry J. Ruffaner, Ellwood City, PA (US); Matthew W. Skinner, Pittsburgh, PA (US); Jonathan G. Weis, Allison Park, PA (US); Inanllely Y. Gonzalez, Pittsburgh, PA (US); Hyun Wook Ro, Gibsonia, PA (US); Samuel L. Esarey, Allison Park, PA (US); Pawel M. Krys, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 18/828,122

(22) Filed: Sep. 9, 2024

(65) Prior Publication Data

US 2024/0425375 A1     Dec. 26, 2024

Related U.S. Application Data

(62) Division of application No. 17/432,567, filed as application No. PCT/US2020/018900 on Feb. 19, 2020, now Pat. No. 12,084,349.

(60) Provisional application No. 62/808,126, filed on Feb. 20, 2019.

(51) Int. Cl.

| | |
|---|---|
| *C10M 125/02* | (2006.01) |
| *C01B 32/194* | (2017.01) |
| *C08F 26/10* | (2006.01) |
| *C08K 9/00* | (2006.01) |
| *C09C 1/44* | (2006.01) |
| *C09C 3/04* | (2006.01) |
| *C10M 149/10* | (2006.01) |
| *C10M 161/00* | (2006.01) |
| *C10M 169/04* | (2006.01) |
| *H01M 4/62* | (2006.01) |
| *H01M 10/0525* | (2010.01) |

(Continued)

(52) U.S. Cl.
CPC ............ *C01B 32/194* (2017.08); *C08F 26/10* (2013.01); *C08K 9/00* (2013.01); *C09C 1/44* (2013.01); *C09C 3/041* (2013.01); *C10M 125/02* (2013.01); *C10M 149/10* (2013.01); *C10M 161/00* (2013.01); *C10M 169/044* (2013.01); *H01M 4/622* (2013.01); *H01M 4/625* (2013.01); *H01M 10/0525* (2013.01);

*C01B 2204/22* (2013.01); *C01B 2204/32* (2013.01); *C01P 2002/82* (2013.01); *C01P 2004/04* (2013.01); *C01P 2004/54* (2013.01); *C01P 2006/22* (2013.01); *C08K 2201/001* (2013.01); *C08K 2201/006* (2013.01); *C08K 2201/011* (2013.01); *C08K 2201/016* (2013.01); *C10M 2201/041* (2013.01); *C10M 2203/003* (2013.01); *C10M 2217/028* (2013.01); *C10N 2020/06* (2013.01); *C10N 2050/015* (2020.05)

(58) Field of Classification Search
CPC .............. C01B 32/194; C01B 2204/22; C01B 2204/32; C08F 26/10; C08K 9/00; C08K 2201/001; C08K 2201/006; C08K 2201/011; C08K 2201/016; C09C 1/44; C09C 3/041; C10M 125/02; C10M 149/10; C10M 161/00; C10M 169/044; C10M 2201/041; C10M 2203/003; C10M 2217/028; C10M 169/041; C10M 171/06; C10M 2201/02; C10M 2209/084; C10M 2217/024; H01M 4/622; H01M 4/625; H01M 10/0525; H01M 4/133; H01M 4/583; H01M 4/62; H01M 10/052; H01M 4/1393; H01M 4/587; C01P 2002/82; C01P 2004/04; C01P 2004/54; C01P 2006/22; C01P 2004/03; C01P 2006/12; C10N 2020/06; C10N 2050/015; C10N 2020/04; C10N 2030/68; C10N 2050/02; C10N 2070/02; Y02E 60/10

See application file for complete search history.

(56) References Cited

U.S. PATENT DOCUMENTS

| | | | |
|---|---|---|---|
| 2012/0104329 A1 | 5/2012 | Meyer et al. | |
| 2015/0056516 A1* | 2/2015 | Hellring ............ | H01M 10/0525 429/231.95 |

(Continued)

FOREIGN PATENT DOCUMENTS

| | | | |
|---|---|---|---|
| CN | 104993137 A | * 10/2015 | |
| JP | 2012-520224 A | 9/2012 | |

(Continued)

*Primary Examiner* — Taiwo Oladapo

(57) ABSTRACT

Graphenic carbon nanoparticles that are dispersed in solvents through the use of dispersant resins are disclosed. The graphenic carbon nanoparticles may be milled prior to dispersion. The dispersant resins may comprise a polymeric dispersant resin comprising an addition polymer comprising the residue of a vinyl heterocyclic amide, an addition polymer comprising a homopolymer, a block (co)polymer, a random (co)polymer, an alternating (co)polymer, a graft (co)polymer, a brush (co)polymer, a star (co)polymer, a telechelic (co)polymer, or a combination thereof. The solvents may be aqueous, non-aqueous, inorganic and/or organic solvents. The dispersions are highly stable and may contain relatively high loadings of the graphenic carbon nanoparticles.

16 Claims, 22 Drawing Sheets

(51) Int. Cl.
   *C10N 20/06*          (2006.01)
   *C10N 50/00*          (2006.01)

(56)                References Cited

U.S. PATENT DOCUMENTS

2015/0284619 A1 *  10/2015  Price Hoelscher  ...  E21B 47/024
                                                          507/140
2016/0115413 A1 *   4/2016  Hasegawa  ............  C10M 125/02
                                                          508/113

FOREIGN PATENT DOCUMENTS

| | | | |
|----|--------------|---|---------|
| JP | 2014-127518 | A | 7/2014 |
| JP | 2015-199623 | A | 11/2015 |
| JP | 2016-025077 | A | 2/2016 |
| JP | 2017-532748 | A | 11/2017 |
| JP | 2018-045820 | A | 3/2018 |

* cited by examiner

| HV | mag ⊠ | WD | HFW | det | ⊢————— 30µm —————⊣ |
|---|---|---|---|---|---|
| 10.00 kV | 2 000 x | 9.5 mm | 63.5 µm | vCD | label |

| HV | mag ⊠ | WD | HFW | det | ⊢————— 30µm —————⊣ |
|---|---|---|---|---|---|
| 10.00 kV | 2 000 x | 9.4 mm | 63.5 µm | vCD | label |

| HV | mag ⋈ | WD | HFW | det | 30μm |
|----|----|----|----|----|----|
| 10.00 kV | 2 000 x | 9.5 mm | 63.5 μm | vCD | label |

| HV | mag ⋈ | WD | HFW | det | 30μm |
|----|----|----|----|----|----|
| 10.00 kV | 2 000 x | 9.5 mm | 63.5 μm | vCD | label |

| HV | mag ⋈ | WD | HFW | det | ⊢————————40µm————————⊣ |
|---|---|---|---|---|---|
| 10.00 kV | 1 500 x | 10.0 mm | 84.7 µm | vCD | |

| HV | mag ⋈ | WD | HFW | det | ⊢————————40µm————————⊣ |
|---|---|---|---|---|---|
| 10.00 kV | 1 500 x | 9.9 mm | 84.7 µm | vCD | |

| HV | mag ⊠ | WD | HFW | det | ├─────────── 40μm ───────────┤ |
|---|---|---|---|---|---|
| 10.00 kV | 1 500 x | 10.3 mm | 84.7 μm | vCD | |

| HV | mag ⊠ | WD | HFW | det | ├─────────── 40μm ───────────┤ |
|---|---|---|---|---|---|
| 10.00 kV | 1 500 x | 10.3 mm | 84.7 μm | vCD | |

DISPERSIONS CONTAINING GRAPHENIC CARBON NANOPARTICLES AND DISPERSANT RESINS

CROSS-REFERENCE TO RELATED APPLICATION

This application is a divisional application of U.S. patent application Ser. No. 17/432,567, filed Aug. 20, 2021, now U.S. Pat. No. 12,084,349, issued Sep. 10, 2024, which is a 371 national stage entry of PCT/US2020/018900, filed Feb. 19, 2020, which claims priority to and the benefit of U.S. Provisional Patent Application Ser. No. 62/808,126 filed Feb. 20, 2019, all of which are incorporated herein by reference in their entirety.

FIELD OF THE INVENTION

The present invention relates to dispersions containing graphenic carbon particles and dispersant resins, and more particularly relates to dispersions of milled graphenic carbon particles and dispersant resins in aqueous and/or organic solvents.

BACKGROUND

Graphene nanoparticles have many current and potential uses. However, such nanoparticles can be difficult to disperse in other materials.

SUMMARY OF THE INVENTION

The present invention provides a dispersion comprising a solvent, graphenic carbon nanoparticles having an average aspect ratio of greater than 3:1 and a Raman 2D:G peak ratio of at least 1:1, and a polymeric dispersant resin comprising an addition polymer comprising the residue of a vinyl heterocyclic amide.

The present invention also provides a dispersion comprising an organic solvent, graphenic carbon nanoparticles, a polymeric dispersant resin comprising an addition polymer comprising a homopolymer, a block (co)polymer, a random (co)polymer, an alternating (co)polymer, a graft (co)polymer, a brush (co)polymer, a star (co)polymer, a telechelic (co)polymer.

The present invention further provides a method of dispersing graphenic carbon nanoparticles in a solvent comprising mixing a dispersant resin into the solvent, wherein the dispersant resin comprises an addition polymer comprising the residue of a vinyl heterocyclic amide, an addition polymer comprising a homopolymer, a block (co)polymer, a random (co)polymer, an alternating (co)polymer, a graft (co)polymer, a brush (co)polymer, a star (co)polymer, a telechelic (co)polymer, or a combination thereof, and mixing the graphenic carbon nanoparticles into the solvent and dispersant resin mixture.

DETAILED DESCRIPTION

Figures 1, 2:
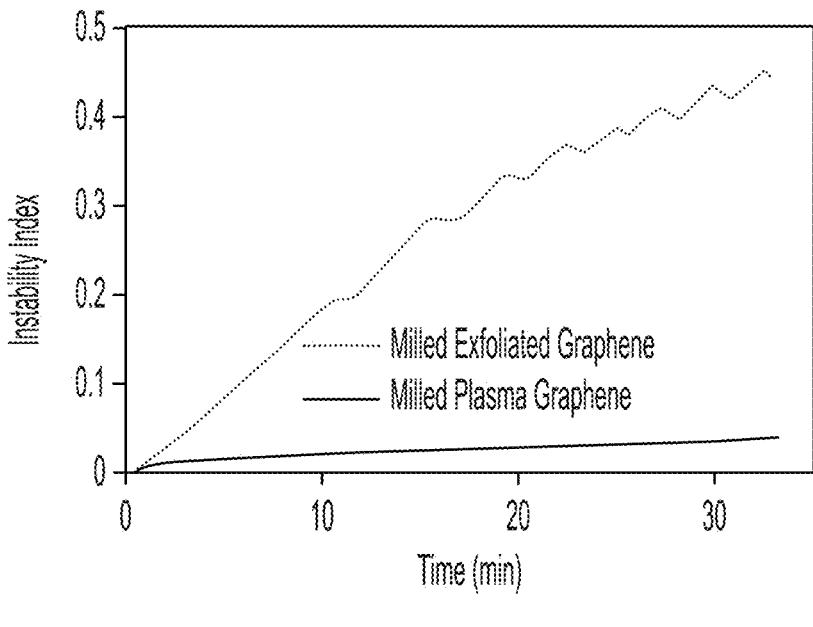
FIG. 1 is a graph of instability index versus time for oil dispersions containing milled plasma graphenic carbon particles and milled exfoliated graphenic carbon.
FIG. 2 is a graph of instability index versus time for aqueous dispersions containing milled plasma graphenic carbon particles and milled exfoliated graphenic carbon particles.

The present invention provides dispersions of graphenic carbon nanoparticles that are stable during storage and use. The stable dispersions may be used in many different applications including conductive inks, battery anode and/or cathode coatings, supercapacitors, EMI shielding, RFI shielding, thermally conductive coatings, electrically conductive coatings, lubricants, coolants, composites, 3-D printing and the like. Conductive inks may include silver inks, medical electrode inks, silver hybrids, carbon inks, dielectric inks, zinc electrode battery inks, manganese battery inks, thermoset carbon battery inks, IR-transparent security ink and low resistance UV inks. Applications of conductive ink include smartphones, tablets, interactive and electrochromic displays, biomedical sensors, printed keypads, industrial membrane switch controls, RFID tags and other products with printed circuitry.

As used herein, the term "dispersed" means that graphenic carbon nanoparticles are dispersed in a medium such as a solvent containing a polymeric dispersant to form a substantially uniform dispersion of the graphenic carbon nanoparticles throughout the medium without substantial agglomeration of the particles. As more fully described below, the uniformity of the dispersions may be measured by an "instability index". The presence of agglomerations may be determined by standard methods such as visual analysis of TEM micrograph images. Agglomerations may also be detected by standard particle size measurement techniques, as well as measurements of electrical conductivity or measurements of optical characteristics of materials containing the graphenic carbon particles such as color, haze, jetness, reflectance and transmission properties.

The graphenic carbon nanoparticles may be milled to improve their dispersibility and/or stability in the compositions. Various different types of milling techniques may be used, such as solid-state milling, ball milling, dry-ball milling, Eiger milling, LAU milling, Cowles blade milling, and the like.

In addition to graphenic carbon nanoparticles, the dispersions include various types of resin dispersants. The resins may improve dispersion and/or stability of the graphenic carbon nanoparticles in the dispersions. For example, the resin dispersant may include a combination of lauryl methacrylate (LMA) and vinyl pyrrolidone (VP) resins. LMA-VP copolymers may be synthesized using conventional free radical polymerization chemistry. In such formulations, the LMA may typically comprise from 10 to 90 weight percent, and the VP may typically comprise from 10 to 90 weight percent. For example, the LMA may range from 40 or 50 to 85 weight percent, and the VP may range from 15 to 50 or 60 weight percent. In certain embodiments, the LMA may comprise about 75 weight percent, and the VP may comprise about 25 weight percent. The resin dispersants may promote dispersion and stability in milled and non-milled graphenic carbon nanoparticle dispersions.

For example, the resin dispersant may include an addition copolymer comprising the residue of stearyl acrylate (SA) and vinyl pyrrolidone (VP). SA-VP copolymers may be synthesized using conventional free radical polymerization chemistry. In such formulations, the SA may typically comprise from 10 to 90 weight percent, and the VP may typically comprise from 10 to 90 weight percent. For example, the SA may range from 40 or 50 to 85 weight percent, and the VP may range from 15 to 50 or 60 weight percent. In certain embodiments, the SA may comprise about 75 weight percent, and the VP may comprise about 25 weight percent.

For example, the resin dispersant may include an addition polymer comprising the residue of vinyl pyrrolidone, such as, for example, polyvinyl pyrrolidone (PVP). The PVP may have a weight average molecular weight of at least 1,000 g/mol, such as at least 3,000 g/mol, such as at least 5,000 g/mol. The PVP may have a weight average molecular weight of no more than 2,000,000 g/mol, such as no more than 1,000,000 g/mol, such as no more than 500,000 g/mol, such as no more than 100,000 g/mol, such as no more than 50,000 g/mol, such as no more than 20,000 g/mol, such as no more than 15,000 g/mol. The PVP may have a weight average molecular weight of from 1,000 to 2,000,000 g/mol, such as from 1,000 to 1,000,000 g/mol, such as from 1,000 to 500,000 g/mol, such as from 1,000 to 100,000 g/mol, such as from 3,000 to 50,000 g/mol, such as from 5,000 to 20,000 g/mol, such as 5,000 to 15,000 g/mol.

The weight ratio of the graphenic carbon nanoparticles to resin dispersant may typically range from 0.1:1 to 20:1, for example, from 0.5:1 to 15:1, from 1:1 to 10:1, or from 3:1 to 6:1, such as 1:1, 2:1, 3:1, 4:1, 5:1, 6:1, 7:1, 8:1, 9:1 or 10:1.

The dispersant resins enhance graphenic carbon nanoparticle dispersion stability and may expand utilization of such nanoparticles in applications such as conductive inks, battery manufacturing, thermally conductive coatings, electrically conductive coatings, EMI and RFI shielding coatings, lubricants, composites, 3-D printing, and the like. Advantages of the present dispersants may include extended shelf life, high graphenic carbon nanoparticle loadings and dispersions which remain stable at room temperature and elevated temperatures.

The graphenic carbon nanoparticles and resin dispersants may be added to various types of solvents to produce the dispersions of the present invention. Suitable solvents include aqueous solvents and organic solvents such as N-methyl-2-pyrrolidone (NMP), oil, benzyl alcohol, diethylene glycol monoethyl ester (DE) acetate, triethyl phosphate, and the like.

The graphenic carbon nanoparticles of the present invention may be dispersed in various types of aqueous and organic solvents in relatively large amounts to produce dispersions with relatively high loadings of graphenic carbon particles in comparison with dispersions of conventional graphenic carbon particles. For example, milled graphenic carbon particles may comprise at least 5 weight percent of the total combined weight of the solvent and graphenic carbon particles. For example, the milled graphenic carbon particles may comprise at least 8 weight percent, or at least 10 weight percent, or at least 12 weight percent, or at least 15 weight percent of the dispersions. For example, in water-based solvent dispersions, the milled graphenic carbon particles may be dispersed in amounts up to 20 weight percent, or up to 23 weight percent, up to 25 weight percent, or higher. In organic solvent dispersions such as NMP, the milled graphenic carbon particles may be present in amounts up to 10 weight percent, or up to 12 weight percent, or up to 15 weight percent, or up to 20 weight percent, or higher. Alternatively, the loadings of milled graphenic carbon particles may be relatively low, for example, less than 5 or 3 weight percent, or less than 2 or 1 weight percent, or less than 0.5 or 0.1 weight percent.

The graphenic carbon nanoparticles may be added to base formulations at relatively low loadings in comparison with conventional additives. For example, the dispersions of graphenic carbon nanoparticles of the present invention may be added to base formulations or materials at particle loadings of less than 5 weight percent, or less than 2 weight percent, or less than 1 weight percent, or less than 0.5 weight percent, while meeting or surpassing the performance of conventional graphene-containing formulations and materials. For example, loadings of from 0.05 to 1 weight percent, or from 0.1 to 0.5 weight percent may be used in lubricant formulations.

Instability index analysis may be used for accelerated evaluation of long-term stability, which measures dispersion sedimentation at specified centrifuging speeds and temperatures. Unless otherwise indicated in the specification or claims, the "instability index" is measured as follows: dispersion samples are loaded in a centrifuge and pulsed near IR light at 865 nm is transmitted through the samples. During centrifuging, the near IR light transmitted through the samples is measured with a dispersion analyzer sold under the designation LUMiSizer Model 611 by LuM GmbH. The measurement is made at 25° C. and 4000 rpm centrifuge speed with a relative centrifugal acceleration (RCA) of 2202 during 20 minutes of centrifuging. The transmission level at the beginning of the centrifuging is compared with the transmission level at the end of the 20-minute period, and the instability index is calculated by normalizing the recorded change in transmission levels. The instability index reported is a dimensionless number between 0 and 1, with "0" meaning no changes of particle concentration and "1" meaning that a dispersion has completely phase separated. A relatively unstable dispersion will exhibit a higher increase in transmission due to significant phase separation of the graphenic carbon nanoparticles and solvent, while a relatively stable dispersion will exhibit a lower increase in transmission due to less phase separation. The instability index may be calculated using the SEP-View® software tool. A description of how the SEPView® software tool determines the instability index is provided in the article entitled "Instability Index" (T. Detloff, T. Sobisch, D. Lerche, *Instability Index,* Dispersion Letters Technical, T4 (2013) 1-4, Update 2014), which is incorporated herein by reference. The instability index of aqueous dispersions of milled graphenic carbon nanoparticles may typically be less than 0.7, for example, less than 0.6, or less than 0.5, or less than 0.4, or less than 0.3, or less than 0.1. The instability index of dispersions of milled graphenic carbon nanoparticles in oil solvents is typically less than 0.5, for example, less than 0.4, or less than 0.3, or less than 0.2 or less than 0.1.

The instability index may be at least 10% lower than a similar dispersion containing non-milled graphenic carbon particles, for example, at least 50% lower, or at least 100% lower, or at least 300% lower, or at least 500% lower.

Solvent mixtures containing the milled graphenic carbon particles may have lower viscosities in comparison with similar solvent mixtures containing non-milled graphenic carbon nanoparticles. For example, at a loading of 1 weight percent graphenic carbon nanoparticles, the milled graphenic carbon particles may result in a viscosity of the solvent dispersion that is at least 10 or 20 percent less than the viscosity of a similar solvent dispersion with non-milled graphenic carbon particles. Viscosity may be measured by standard techniques in which rheological measurements are collected using an Anton Paar MCR 302 and a CP50-1/TG measuring cone. Viscosity measurements at a shear rate of 10 Hz may be used for comparison of dispersion rheologies.

The milled graphenic carbon nanoparticle dispersions may be added to various base formulations, e.g., by stirring, shaking, grinding, milling and the like. As described above, the base formulations to which the graphenic carbon nanoparticle dispersions may be added may comprise various types of inks, coatings, lubricants, etc.

The graphenic carbon particles used in the present invention may be obtained from commercial sources, for example, from Raymor, Angstron, XG Sciences and other commercial sources. As discussed in detail below, the graphenic carbon particles may be thermally produced in accordance with the methods and apparatus described in U.S. Pat. Nos. 8,486, 363, 8,486,364 and 9,221,688, which are incorporated herein by reference. Carbon nanotubes or other carbon-containing materials such as conductive carbon black, graphite, and the like may be used in combination with, or in place of, the graphenic carbon particles.

As used herein, the term "graphenic carbon particles" means carbon particles having structures comprising one or more layers of one-atom-thick planar sheets of sp$^2$-bonded carbon atoms that are densely packed in a honeycomb crystal lattice. The average number of stacked layers may be less than 100, for example, less than 50. In certain embodiments, the average number of stacked layers is 30 or less, such as 20 or less, 10 or less, or, in some cases, 5 or less. The average number of stacked layers may be greater than 2, for example, greater than 3, or greater than 4. At least a portion of the graphenic carbon particles may be in the form of platelets that are substantially curved, curled, creased or buckled. The graphenic carbon nanoparticles may be turbo-static, i.e., adjacent stacked atom layers do not exhibit ordered AB Bernal stacking associated with conventional exfoliated graphene, but rather exhibit disordered or non-ABABAB stacking. Alternatively, the graphenic carbon particles may be in the form of nanotubes. The particles typically do not have a spheroidal or equiaxed morphology.

The graphenic carbon nanoparticles may have a thickness, measured in a direction perpendicular to the carbon atom layers, of no more than 10 nanometers, no more than 5 nanometers, or, in certain embodiments, no more than 4 or 3 or 2 or 1 nanometers, such as no more than 3.6 nanometers. The graphenic carbon particles may be from 1 atom layer up to 3, 6, 9, 12, 20 or 30 atom layers thick, or more. The graphenic carbon particles present in the compositions of the present invention have a width and length, measured in a direction parallel to the carbon atoms layers, of at least 50 nanometers, such as more than 100 nanometers, in some cases more than 100 nanometers up to 500 nanometers, or more than 100 nanometers up to 200 nanometers. The graphenic carbon particles may be provided in the form of ultrathin flakes, platelets or sheets having relatively high aspect ratios (aspect ratio being defined as the ratio of the longest dimension of a particle to the shortest dimension of the particle) of greater than 3:1, such as greater than 10:1. Alternatively, when the graphenic carbon particles are in the form of nanotubes, they may have outer diameters ranging from 0.3 to 100 nanometers, or from 0.4 to 40 nanometers, lengths ranging from 0.3 nanometers to 50 centimeters, or from 500 nanometers to 500 microns, and length: diameter aspect ratios ranging from 1:1 to 100,000,000:1, or from 10:1 to 10,000:1.

The graphenic carbon particles may have relatively low oxygen content. For example, the graphenic carbon particles may, even when having a thickness of no more than 5 or no more than 2 nanometers, have an oxygen content of no more than 2 atomic weight percent, such as no more than 1.5 or 1 atomic weight percent, or no more than 0.6 atomic weight, such as about 0.5 atomic weight percent. The oxygen content of the graphenic carbon particles can be determined using X-ray Photoelectron Spectroscopy, such as is described in D. R. Dreyer et al., Chem. Soc. Rev. 39, 228-240 (2010).

The graphenic carbon particles may have a B.E.T. specific surface area of at least 50 square meters per gram, such as 70 to 1000 square meters per gram, or, in some cases, 200 to 1000 square meters per grams or 200 to 400 square meters per gram. As used herein, the term "B.E.T. specific surface area" refers to a specific surface area determined by nitrogen adsorption according to the ASTMD 3663-78 standard based on the Brunauer-Emmett-Teller method described in the periodical "The Journal of the American Chemical Society", 60, 309 (1938).

The graphenic carbon particles may have a Raman spectroscopy 2D/G peak ratio of at least 0.9:1, or 0.95:1, or 1:1, for example, at least 1.2:1 or 1.3:1. As used herein, the term "2D/G peak ratio" refers to the ratio of the intensity of the 2D peak at 2692 $cm^{-1}$ to the intensity of the G peak at 1,580 $cm^{-1}$. Such 2D/G peak ratios may be present in graphenic carbon nanoparticles having an average number of stacked layers greater than 2, such as 3 or more stacked layers.

The graphenic carbon particles may have a relatively low bulk density. For example, the graphenic carbon particles used in certain embodiments of the present invention are characterized by having a bulk density (tap density) of less than 0.2 $g/cm^3$, such as no more than 0.1 $g/cm^3$. For the purposes of the present invention, the bulk density of the milled graphenic carbon particles is determined by placing 0.4 grams of the graphenic carbon particles in a glass measuring cylinder having a readable scale. The cylinder is raised approximately one inch and tapped 100 times, by striking the base of the cylinder onto a hard surface, to allow the graphenic carbon particles to settle within the cylinder. The volume of the particles is then measured, and the bulk density is calculated by dividing 0.4 grams by the measured volume, wherein the bulk density is expressed in terms of $g/cm^3$.

The graphenic carbon particles may have a compressed density and a percent densification that is less than the compressed density and percent densification of graphite powder and certain types of substantially flat graphenic carbon particles. Lower compressed density and lower percent densification are each currently believed to contribute to better dispersion and/or rheological properties than graphenic carbon particles exhibiting higher compressed density and higher percent densification. In certain embodiments, the compressed density of the graphenic carbon particles is 0.9 or less, such as less than 0.8, less than 0.7, such as from 0.6 to 0.7. In certain embodiments, the percent densification of the graphenic carbon particles is less than 40%, such as less than 30%, such as from 25 to 30%.

For purposes of the present invention, the compressed density of graphenic carbon particles is calculated from a measured thickness of a given mass of the particles after compression. Specifically, the measured thickness is determined by subjecting 0.1 grams of the graphenic carbon particles to cold press under 15,000 pound of force in a 1.3 centimeter die for 45 minutes, wherein the contact pressure is 500 MPa. The compressed density of the graphenic carbon particles is then calculated from this measured thickness according to the following equation:

$$\text{Compressed Density } (g/cm^3) = \frac{0.1 \text{ grams}}{\prod * (1.3 \text{ cm}/2)^2 * (\text{measured thickness in cm})}$$

The percent densification of the graphenic carbon particles is then determined as the ratio of the calculated compressed density of the graphenic carbon particles, as determined above, to 2.2 $g/cm^3$, which is the density of graphite.

The graphenic carbon particles may have a measured bulk liquid conductivity of at least 100 microSiemens, such as at least 120 microSiemens, such as at least 140 microSiemens immediately after mixing and at later points in time, such as at 10 minutes, or 20 minutes, or 30 minutes, or 40 minutes. For the purposes of the present invention, the bulk liquid conductivity of the graphenic carbon particles is determined as follows. First, a sample comprising a 0.5% solution of graphenic carbon particles in butyl cellosolve is sonicated for 30 minutes with a bath sonicator. Immediately following sonication, the sample is placed in a standard calibrated electrolytic conductivity cell (K=1). A Fisher Scientific AB 30 conductivity meter is introduced to the sample to measure the conductivity of the sample. The conductivity is plotted over the course of about 40 minutes.

The graphenic carbon particles may be substantially free of unwanted or deleterious materials. For example, the graphenic carbon particles may contain zero or only trace amounts of polycyclic aromatic hydrocarbons (PAHs), e.g., less than 2 weight percent PAH, less than 1 weight percent PAH, or zero PAH.

Starting graphenic carbon nanoparticles utilized in the present invention can be made, for example, by thermal processes. In accordance with embodiments of the invention, thermally produced graphenic carbon particles are made from carbon-containing precursor materials that are heated to high temperatures in a thermal zone such as a plasma. The carbon-containing precursor, such as a hydrocarbon provided in gaseous or liquid form, is heated in the thermal zone to produce the graphenic carbon particles in the thermal zone or downstream therefrom. For example, thermally produced graphenic carbon particles may be made by the systems and methods disclosed in U.S. Pat. Nos. 8,486,363, 8,486,364 and 9,221,688.

The graphenic carbon particles may be made by using the apparatus and method described in U.S. Pat. No. 8,486,363 in which (i) one or more hydrocarbon precursor materials capable of forming a two-carbon fragment species (such as n-propanol, ethane, ethylene, acetylene, vinyl chloride, 1,2-dichloroethane, allyl alcohol, propionaldehyde, and/or vinyl bromide) is introduced into a thermal zone (such as a plasma), and (ii) the hydrocarbon is heated in the thermal zone to a temperature of at least 1,000° C. to form the graphenic carbon particles. The graphenic carbon particles may be made by using the apparatus and method described in U.S. Pat. No. 8,486,364 in which (i) a methane precursor material (such as a material comprising at least 50 percent methane, or, in some cases, gaseous or liquid methane of at least 95 or 99 percent purity or higher) is introduced into a thermal zone (such as a plasma), and (ii) the methane precursor is heated in the thermal zone to form the graphenic carbon particles. Such methods can produce graphenic carbon particles having at least some, in some cases all, of the characteristics described above.

During production of the graphenic carbon particles by the thermal production methods described above, a carbon-containing precursor is provided as a feed material that may be contacted with an inert carrier gas. The carbon-containing precursor material may be heated in a thermal zone, for example, by a plasma system such as a DC plasma, RF plasma, microwave plasma, etc. In certain embodiments, the precursor material is heated to a temperature ranging from greater than 2,000° C. to 20,000° C. or more, such as 3,000° C. to 15,000° C. For example, the temperature of the thermal zone may range from 3,500 to 12,000° C., such as from 4,000 to 10,000° C. Although the thermal zone may be generated by a plasma system, it is to be understood that any other suitable heating system may be used to create the thermal zone, such as various types of furnaces including electrically heated tube furnaces and the like.

The gaseous stream may be contacted with one or more quench streams that are injected into the plasma chamber through at least one quench stream injection port. The quench stream may cool the gaseous stream to facilitate the formation or control the particle size or morphology of the graphenic carbon particles. In certain embodiments of the invention, after contacting the gaseous product stream with the quench streams, the ultrafine particles may be passed through a converging member. After the graphenic carbon particles exit the plasma system, they may be collected. Any suitable means may be used to separate the graphenic carbon particles from the gas flow, such as, for example, a bag filter, cyclone separator or deposition on a substrate.

Without being bound by any theory, it is currently believed that the foregoing methods of manufacturing graphenic carbon nanoparticles are particularly suitable for producing graphenic carbon nanoparticles having relatively low thickness and relatively high aspect ratio in combination with relatively low oxygen content, as described above. Moreover, such methods are currently believed to produce a substantial amount of graphenic carbon nanoparticles having a substantially curved, curled, creased or buckled morphology (referred to herein as a "3D" morphology), as opposed to producing predominantly particles having a substantially two-dimensional (or flat) morphology. This characteristic is believed to be reflected in the previously described compressed density characteristics and is believed to be beneficial in the present invention because, it is currently believed, when a significant portion of the graphenic carbon particles have a 3D morphology, "edge to edge" and "edge-to-face" contact between graphenic carbon particles within the composition may be promoted. This is thought to be because particles having a 3D morphology are less likely to be aggregated in the composition (due to lower Van der Waals forces) than particles having a two-dimensional morphology. Moreover, it is currently believed that even in the case of "face to face" contact between the particles having a 3D morphology, since the particles may have more than one facial plane, the entire particle surface is not engaged in a single "face to face" interaction with another single particle, but instead can participate in interactions with other particles, including other "face to face" interactions, in other planes. As a result, graphenic carbon particles having a 3D morphology may provide good electrically and/or thermally conductive pathways in the dispersions and may be useful for obtaining electrical and/or thermal conductivity characteristics. In addition, the 3D morphology may provide super-lubricity in certain formulations.

The dispersant resins may comprise an addition polymer. The addition polymer may be derived from, and comprise constitutional units comprising the residue of, one or more alpha, beta-ethylenically unsaturated monomers, such as those discussed below, and may be prepared by polymerizing a reaction mixture of such monomers. The mixture of monomers may comprise one or more active hydrogen group-containing ethylenically unsaturated monomers. The reaction mixture may also comprise ethylenically unsaturated monomers comprising a heterocyclic group. As used herein, an ethylenically unsaturated monomer comprising a heterocyclic group refers to a monomer having at least one alpha, beta ethylenic unsaturated group and at least one cyclic moiety having at least one atom in addition to carbon in the ring structure, such as, for example, oxygen, nitrogen or sulfur. Non-limiting examples of ethylenically unsaturated monomers comprising a heterocyclic group include vinyl pyrrolidone and vinyl caprolactam, among others. The reaction mixture may additionally comprise other ethylenically unsaturated monomers such as alkyl esters of (meth) acrylic acid and others described below.

The addition polymer may comprise a (meth)acrylic polymer that comprises constitutional units comprising the residue of one or more (meth)acrylic monomers. The (meth) acrylic polymer may be prepared by polymerizing a reaction mixture of alpha, beta-ethylenically unsaturated monomers that comprise one or more (meth)acrylic monomers and optionally other ethylenically unsaturated monomers. As used herein, the term "(meth)acrylic monomer" refers to acrylic acid, methacrylic acid, and monomers derived therefrom, including alkyl esters of acrylic acid and methacrylic acid, and the like. As used herein, the term "(meth)acrylic polymer" refers to a polymer derived from or comprising constitutional units comprising the residue of one or more (meth)acrylic monomers. The mixture of monomers may comprise one or more active hydrogen group-containing (meth)acrylic monomers, ethylenically unsaturated monomers comprising a heterocyclic group, and other ethylenically unsaturated monomers. The (meth)acrylic polymer may also be prepared with an epoxy functional ethylenically unsaturated monomer such as glycidyl methacrylate in the reaction mixture, and epoxy functional groups on the resulting polymer may be post-reacted with a beta-hydroxy functional acid such as citric acid, tartaric acid, and/or 3-hydroxy-2-naphthoic acid to yield hydroxyl functional groups on the (meth)acrylic polymer.

The addition polymer may comprise constitutional units comprising the residue of an alkyl esters of (meth)acrylic acid containing from 8 to 22 carbon atoms in the alkyl group. Non-limiting examples of alkyl esters of (meth)acrylic acid containing from 8 to 22 carbon atoms in the alkyl group include octyl (meth)acrylate, isodecyl (meth)acrylate, stearyl (meth)acrylate, 2-ethylhexyl (meth)acrylate, decyl (meth)acrylate, behenyl (meth)acrylate, octadecyl (meth) acrylate, and lauryl (meth)acrylate. As a particular example, lauryl methacrylate may be used. The constitutional units comprising the residue of the alkyl esters of (meth)acrylic acid containing from 8 to 22 carbon atoms in the alkyl group may comprise at least 5% by weight, such as at least 10% by weight, such as at least 20% by weight, such as at least 30% by weight, such as at least 50% by weight, such as at least 70% by weight, based on the total weight of the addition polymer.

The addition polymer may comprise constitutional units comprising the residue of a hydroxyalkyl ester. Non-limiting examples of hydroxyalkyl esters include hydroxyethyl (meth)acrylate and hydroxypropyl (meth)acrylate. The constitutional units comprising the residue of the hydroxyalkyl ester may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the hydroxyalkyl ester may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the hydroxyalkyl ester in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture. The inclusion of constitutional units comprising the residue of a hydroxyalkyl ester in the dispersant results in a dispersant comprising at least one hydroxyl group (although hydroxyl groups may be included by other methods).

The addition polymer may comprise constitutional units comprising the residue of a vinyl heterocyclic amide. Non-limiting examples of vinyl heterocyclic amides include vinyl pyrrolidone and vinyl caprolactam, among others. The constitutional units comprising the residue of the ethylenically unsaturated monomers comprising a heterocyclic group may comprise at least 0.5% by weight, such as at least 1% by weight, such as at least 10% by weight, such as at least 20% by weight, such as at least 40% by weight, such as at least 50% by weight, and may be no more than 90% by weight, such as no more than 85% by weight, such as no more than 60% by weight, such as no more than 50% by weight, such as no more than 40% by weight, such as no more than 30% by weight, such as no more than 20% by weight, based on the total weight of the addition polymer. The constitutional units comprising the residue of the ethylenically unsaturated monomers comprising a heterocyclic group may comprise 0.5% to 99% by weight, such as 0.5% to 50% by weight, such as 1% to 40% by weight, such as 5% to 30% by weight, 8% to 27% by weight, such as 10% to 90% by weight, such as 15% to 60% by weight, such as 15% to 50% by weight, such as 40% to 85% by weight, such as 50% to 85% by weight, based on the total weight of the addition polymer. The addition polymer may be derived from a reaction mixture comprising the ethylenically unsaturated monomers comprising a heterocyclic group in an amount of 0.5% to 50% by weight, such as 1% to 40% by weight, such as 5% to 30% by weight, 8% to 27% by weight, such as 10% to 90% by weight, such as 15% to 60% by weight, such as 15% to 50% by weight, such as 40% to 85% by weight, such as 50% to 85% by weight, based on the total weight of polymerizable monomers used in the reaction mixture.

The addition polymer may comprise constitutional units comprising the residue of other alpha, beta-ethylenically unsaturated monomers. Non-limiting examples of other alpha, beta-ethylenically unsaturated monomers include vinyl aromatic compounds such as styrene, alpha-methyl styrene, alpha-chlorostyrene and vinyl toluene; organic nitriles such as acrylonitrile and methacrylonitrile; allyl monomers such as allyl chloride and allyl cyanide; monomeric dienes such as 1,3-butadiene and 2-methyl-1,3-butadiene; and acetoacetoxyalkyl (meth)acrylates such as acetoacetoxyethyl methacrylate (AAEM) (which may be self-crosslinking). The constitutional units comprising the residue of the other alpha, beta-ethylenically unsaturated monomers may comprise at least 0.5% by weight, such as at least 1% by weight, such as at least 2% by weight, and may be no more than 30% by weight, such as no more than 20% by weight, such as no more than 10% by weight, such as no more than 5% by weight, based on the total weight of the addition polymer. The constitutional units comprising the residue of the other alpha, beta-ethylenically unsaturated monomers may comprise 0.5% to 30% by weight, such as 1% to 20% by weight, such as 2% to 20% by weight, 2% to 10% by weight, such as 2% to 5% by weight, based on the total weight of the addition polymer. The addition polymer may be derived from a reaction mixture comprising the other alpha, beta-ethylenically unsaturated monomers in an amount of 0.5% to 30% by weight, such as 1% to 20% by weight, such as 2% to 20% by weight, 2% to 10% by weight, such as 2% to 5% by weight, based on the total weight of polymerizable monomers used in the reaction mixture.

The addition polymers may be prepared by conventional free radical initiated solution polymerization techniques in which the polymerizable monomers are dissolved in a second organic medium comprising a solvent or a mixture of solvents and polymerized in the presence of a free radical initiator until conversion is complete. The second organic medium used to prepare the addition polymer may be the same as the organic medium present in the dispersion composition such that the composition of the organic medium is unchanged by addition of the addition polymer solution. For example, the second organic medium may comprise the same primary solvent(s) and co-solvent(s) in the same ratios as the organic medium of the dispersion composition. Alternatively, the second organic medium used to prepare the addition polymer may be different and distinct from the organic medium of the dispersion composition. The second organic medium used to produce the addition polymer may comprise any suitable organic solvent or mixture of solvents, including those discussed above with respect to the organic medium, such as, for example, Aromatic 200, Solvesso 200, and the like.

Examples of free radical initiators are those which are soluble in the mixture of monomers such as azobisisobutyronitrile, azobis (alpha, gamma-methylvaleronitrile), tertiary-butyl perbenzoate, tertiary-butyl peracetate, benzoyl peroxide, ditertiary-butyl peroxide and tertiary amyl peroxy 2-ethylhexyl carbonate.

Optionally, a chain transfer agent which is soluble in the mixture of monomers such as alkyl mercaptans, for example, tertiary-dodecyl mercaptan; ketones such as methyl ethyl ketone, chlorohydrocarbons such as chloroform can be used. A chain transfer agent provides control over the molecular weight to give products having required viscosity for various coating applications. Tertiary-dodecyl mercaptan is preferred because it results in high conversion of monomer to polymeric product.

The addition polymers may be prepared with other architectures as well as random and alternating copolymer structures, including but not limited to block copolymers, graft copolymers, brush copolymers, star copolymers, and telechelic copolymers.

Block copolymers used herein can generally be described with a structure [A]-b-[B], where "b" indicates block structures as opposed to "r" which would indicate random structure. Although many block copolymers, including the one presented in this invention are diblock copolymers, it is not uncommon to have additional blocks. The blocks of a block copolymer can be synthesized in any order (sequence) to achieve the resin performance. However, some synthetic limitations may exist for choosing the order of blocks. The individual blocks of the block copolymer can be homopolymers or can be copolymers of two or more monomers. Complete conversion of the first monomer is not required before synthesizing the second block, so the second block can be a copolymer of residual monomers from the first block and monomers from the second block (i.e., [A]-b-[A-r-B]). This can sometimes be referred to as a "gradient" or "tapered" copolymer.

The block copolymer (e.g., diblock or triblock) may be produced via controlled radical polymerization of at least one ethylenically unsaturated monomer via a reverse addition-fragmentation chain transfer (RAFT) mechanism, atom transfer radical polymerization (ATRP), nitroxide mediated polymerization technique, and organometallic-mediated radical polymerization (OMRP), most notably Cobalt-mediated radical polymerization (CMRP). Other methods include iodine mediated polymerization, group transfer polymerization (GTP), anionic polymerization, cationic polymerization. The choice of the method depends on many parameters such as cost, compatibility with chosen monomers, tolerance to functional groups, temperature of operation, if the presence of catalyst (e.g. metal) is undesirable in final product, etc. It is to be understood that the first, second, and, if used, third blocks of the block copolymer may be produced in any order (sequence), and that one of the blocks may be reactive with the first and/or second component.

As used herein, the term "controlled radical polymerization" and related terms such as "controlled radical polymerization process" includes, but is not limited to, ATRP, single electron transfer (SET) polymerization, RAFT, and nitroxide-mediated polymerization.

Controlled radical polymerization, such as RAFT and the others listed above, is described generally as a "living polymerization," i.e., a chain-growth polymerization that propagates with essentially no chain transfer and essentially no chain termination. The molecular weight of a polymer prepared by controlled radical polymerization can be controlled by the stoichiometry of the reactants, such as the initial concentration of monomer(s) and initiator(s). Controlled radical polymerization techniques allow for chain extension of a polymer of one monomer with a second type of polymer to yield a block copolymer. In addition, controlled radical polymerization also provides polymers having characteristics including narrow molecular weight distributions, such as polydispersity index (PDI) values within a desired range; and/or well-defined polymer chain structure, such as block copolymers and alternating copolymers.

The ATRP process can be described generally as including: polymerizing one or more radically polymerizable monomers in the presence of an initiation system and forming a polymer. The initiation system may include an initiator having at least one radically transferable atom or group; a transition metal compound, such as a catalyst, which participates in a reversible redox cycle with the initiator; and a ligand, which coordinates with the transition metal compound. The ATRP process is described in further detail in U.S. Pat. Nos. 5,763,548, 5,789,487, 5,807,937, 6,538,091, 6,887,962, 7,572,874, 7,893,173, 7,893,174, and 8,404,788.

Reversible Addition-Fragmentation chain Transfer, or RAFT, polymerization is one of several kinds of reversible-deactivation radical polymerization. It makes use of a chain transfer agent in the form of a thiocarbonylthio or similar compound (such as dithioesters, thiocarbamates, and xanthates; also known as a RAFT agent) to mediate the polymerization via a reversible chain-transfer process and thus afford control over the generated molecular weight, architecture, and polydispersity during a free-radical polymerization.

Nitroxide-mediated radical polymerization is a method of radical polymerization that makes use of an alkoxyamine initiator to generate polymers with well controlled stereochemistry and a very low polydispersity index. It is a type of reversible-deactivation radical polymerization.

Graphenic carbon nanoparticle dispersions of the present invention may be used to produce various types of material compositions. The compositions may comprise any of a variety of thermoplastic and/or thermosetting compositions known in the art. For example, the coating compositions can comprise film-forming resins selected from epoxy resins, acrylic polymers, polyester polymers, polyurethane polymers, polyamide polymers, polyether polymers, bisphenol A based epoxy polymers, polysiloxane polymers, styrenes, ethylenes, butylenes, copolymers thereof, and mixtures thereof. Generally, these polymers can be any polymers of these types made by any method known to those skilled in the art. Such polymers may be solvent borne, water soluble or water dispersible, emulsifiable, or of limited water solubility. Furthermore, the polymers may be provided in sol gel systems, may be provided in core-shell polymer systems, or may be provided in powder form. In certain embodiments, the polymers are dispersions in a continuous phase comprising water and/or organic solvent, for example emulsion polymers or non-aqueous dispersions.

In addition to the resin and graphenic carbon nanoparticle components, the coatings or other materials in accordance with certain embodiments of the present invention may include additional components conventionally added to coating or ink compositions, such as cross-linkers, pigments, tints, flow aids, defoamers, dispersants, solvents, UV absorbers, catalysts and surface active agents.

Thermosetting or curable coating compositions typically comprise film forming polymers or resins having functional groups that are reactive with either themselves or a cross-linking agent. The functional groups on the film-forming resin may be selected from any of a variety of reactive functional groups including, for example, carboxylic acid groups, amine groups, epoxide groups, hydroxyl groups, thiol groups, carbamate groups, amide groups, urea groups, isocyanate groups (including blocked isocyanate groups and tris-alkylcarbamoyltriazine) mercaptan groups, styrenic groups, anhydride groups, acetoacetate acrylates, uretidione and combinations thereof.

Thermosetting coating compositions typically comprise a crosslinking agent that may be selected from, for example, aminoplasts, polyisocyanates including blocked isocyanates, polyepoxides, beta-hydroxyalkylamides, polyacids, anhydrides, organometallic acid-functional materials, polyamines, polyamides, and mixtures of any of the foregoing. Suitable polyisocyanates include multifunctional isocyanates. Examples of multifunctional polyisocyanates include aliphatic diisocyanates like hexamethylene diisocyanate and isophorone diisocyanate, and aromatic diisocyanates like toluene diisocyanate and 4,4'-diphenylmethane diisocyanate. The polyisocyanates can be blocked or unblocked. Examples of other suitable polyisocyanates include isocyanurate trimers, allophanates, and uretdiones of diisocyanates. Examples of commercially available polyisocyanates include DESMODUR N3390, which is sold by Bayer Corporation, and TOLONATE HDT90, which is sold by Rhodia Inc. Suitable aminoplasts include condensates of amines and or amides with aldehyde. For example, the condensate of melamine with formaldehyde is a suitable aminoplast. Suitable aminoplasts are well known in the art. A suitable aminoplast is disclosed, for example, in U.S. Pat. No. 6,316,119 at column 5, lines 45-55, incorporated by reference herein. In certain embodiments, the resin can be self-crosslinking. Self-crosslinking means that the resin contains functional groups that are capable of reacting with themselves, such as alkoxysilane groups, or that the reaction product contains functional groups that are coreactive, for example hydroxyl groups and blocked isocyanate groups.

The dry film thickness of the cured coatings may typically range from less than 0.5 microns to 100 microns or more, for example, from 1 to 50 microns. As a particular example, the cured coating thickness may range from 1 to 15 microns. However, significantly greater coating thicknesses, and significantly greater material dimensions for non-coating materials, are used within the scope of the invention.

As used herein molecular weights are determined by gel permeation chromatography using a polystyrene standard. Unless otherwise indicated molecular weights are on a weight average basis.

In certain aspects of the invention, the graphenic carbon nanoparticle dispersions may be used to produce lithium ion battery cathodes and anodes. Lithium ion batteries may include an anode, a cathode, a separator between the anode and cathode and an electrolyte in contact with the anode and cathode. A casing is provided in electrical contact with the anode, and a terminal is in electrical contact with the cathode.

The electrolyte of the lithium ion battery may typically comprise lithium-containing electrolyte salts dissolved in organic solvents. Examples of lithium-containing electrolyte salts include $LiClO_4$, $LiAsF_6$, $LiPF_6$, $LiBF_4$, $LiB(C_6H_5)_4$, $LiB(C_2O_4)_2$, $CH_3SO_3Li$, $CF_3SO_3Li$, $LiCl$, $LiBr$ and the like. Examples of organic solvents include propylene carbonate, ethylene carbonate, diethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, acetate, butyrate, propionate and the like. Cyclic carbonates such as propylene carbonate, or chain carbonates such as dimethyl carbonate and diethyl carbonate may be used. These organic solvents can be used singly or in a combination of two types or more. In certain embodiments, the electrolyte may also comprise additives or stabilizers such as VC (vinyl carbonate), VEC (vinyl ethylene carbonate), FEC (fluoroethylene carbonate), EA (ethylene acetate), TPP (triphenylphosphate), phosphazenes, LiBOB, LiBETI, LiTFSI, BP (biphenyl), PS (propylene sulfite), ES (ethylene sulfite), AMC (allylmethylcarbonate), and APV (divinyladipate).

The graphenic carbon nanoparticle dispersions may be used to produce lithium ion battery cathode materials as disclosed in U.S. Pat. No. 9,761,903, which is incorporated herein by reference. The graphenic carbon nanoparticle dispersions may be used to produce lithium ion battery anode materials as disclosed in U.S. Patent Application Publication No. 2014/0272591, which is incorporated herein by reference.

The cathode of a lithium ion battery may include a lithium-containing active material, graphenic carbon nanoparticles from the present dispersion, and a binder. The cathode may comprise an electrically conductive substrate, for example, a metal foil comprising Al, carbon-coated aluminum foil, aluminum-celmet or the like. A coating of the cathode material may be deposited and cured on the substrate to form a coating having a typical dry film thickness of from 5 or 10 to 500 microns, for example, from 20 or 25 to 200 microns, for example, from 50 to 100 microns.

The lithium-containing active material of the cathode coating may include $LiFePO_4$, carbon-coated lithium iron phosphate, lithium cobalt oxide, lithium nickel cobalt aluminates, lithium manganate, lithium nickel cobalt manganates and the like. For example, the lithium-containing active material comprises from 50 to 99.9 weight percent of the cured cathode coating material, for example, from 80 to 99.5 weight percent, or from 87 to 99 weight percent. The graphenic carbon nanoparticles may typically comprise from 0.25 to 25 weight percent of the cured cathode coating material, for example, from 0.5 to 10 weight percent, or from 1 or 2 to 8 weight percent.

The binder may typically include polyvinylidene fluoride (PVDF), acrylics, cellulosics such as carboxymethylcellulose and the like. The binder may comprise from 0.25 to 25 weight percent of the cured cathode coating material, for example, from 0.5 to 10 weight percent, or from 1 or 2 to 8 weight percent.

The anode of a lithium ion battery may comprise a conductive substrate such as copper foil, or other metal foils, having a graphenic carbon nanoparticle-containing coating deposited on one or both sides thereof. The graphenic carbon particle-containing anode material may include a mixture of the graphenic carbon nanoparticles with lithium-reactive particles such as Si and/or Sn and a binder.

The anode material may comprise from 15 to 85 weight percent lithium-reactive metal particles, from 3 to 75 weight percent graphenic carbon nanoparticles, and from 3 to 60 weight percent binder. For example, the lithium-reactive metal particles may comprise from 25 to 70 weight percent, or from 30 to 50 weight percent. For example, the graphenic carbon nanoparticles may comprise from 10 to 60 weight percent, or from 30 to 50 weight percent. The lithium-reactive metal particles may comprise Si, Sn or a combination thereof. The lithium-reactive metal particles may typically have an average particle size of less than 1,000 nanometers, for example, from 5 to 200 nanometers, or from 10 to 120 nanometers.

The binder of the anode material may comprise a polymer. For example, the polymeric binder may include poly (acrylic acid) (PAA), acrylate polymers containing greater than 5 weight percent acrylic acid, carboxymethylcellulose, polymethacrylic acid, acrylate polymers containing greater than 5 weight percent methacrylic acid, polyvinylidene fluoride (PVDF), polytetrafluoroethylene (PTFE), acrylic latex dispersions, and the like.

In view of the foregoing, the present invention thus relates, without being limited thereto, to the following aspects:

Aspect 1. A dispersion comprising a solvent; graphenic carbon nanoparticles; and a polymeric dispersant resin.

Aspect 2. The dispersion of Aspect 1, wherein the graphenic carbon nanoparticles have an average aspect ratio of greater than 3:1 and a Raman 2D: G peak ratio of at least 1:1.

Aspect 3. The dispersion of Aspects 1 or 2, wherein the polymeric dispersant resin comprises an addition polymer comprising the residue of a vinyl heterocyclic amide.

Aspect 4. The dispersion of Aspect 3, wherein the vinyl heterocyclic amide comprises vinyl pyrrolidone.

Aspect 5. The dispersion of any of the preceding Aspects, wherein the dispersion has an instability index of less than 0.7.

Aspect 6. The dispersion of any of the preceding Aspects, wherein the graphenic carbon nanoparticles comprise greater than 5 weight percent based on the total weight of the dispersion.

Aspect 7. The dispersion of Aspect 6, wherein the dispersion has an instability index of less than 0.7.

Aspect 8. The dispersion of Aspect 6, wherein the instability index is less than 0.3.

Aspect 9. The dispersion of any of the preceding Aspects, wherein the dispersion has an instability index less than an instability index of an identical dispersion containing graphenic carbon nanoparticles having a Raman 2D: G peak ratio of less than 0.9:1.

Aspect 10. The dispersion of any of the preceding Aspects, wherein the polymeric dispersant comprises polyvinyl pyrrolidone.

Aspect 11. The dispersion of Aspect 10, wherein the polyvinyl pyrrolidone has a weight average molecular weight of 1,000 to 2,000,000.

Aspect 12. The dispersion of any of the preceding Aspects, wherein the graphenic carbon nanoparticles are thermally produced at a temperature of at least 3,500° C.

Aspect 13. The dispersion of any of the preceding Aspects, wherein the graphenic carbon nanoparticles are milled.

Aspect 14. The dispersion of any of the preceding Aspects, wherein the graphenic carbon particles are turbostratic and have a B.E.T. specific surface area of at least 70 square meters per gram.

Aspect 15. The dispersion of any of the preceding Aspects, wherein the solvent comprises water.

Aspect 16. The dispersion of any of the preceding Aspects, wherein the solvent comprises an organic solvent.

Aspect 17. The dispersion of Aspect 16, wherein the organic solvent comprises oil, N-methyl-2-pyrolidone, benzyl alcohol, diethylene glycol monoethyl ester (DE) acetate, and/or triethyl phosphate.

Aspect 18. The dispersion of Aspect 16, wherein the organic solvent comprises oil.

Aspect 19. The dispersion of Aspect 16, wherein the organic solvent comprises N-methyl-2-pyrolidone.

Aspect 20. The dispersion of any of the preceding Aspects, wherein a weight ratio of the graphenic carbon nanoparticles to the dispersant resin is from 0.5:1 to 15:1.

Aspect 21. The dispersion of Aspect 1, wherein the polymeric dispersant resin comprises an addition polymer comprising a homopolymer, a block (co)polymer, a random (co)polymer, an alternating (co)polymer, a graft (co)polymer, a brush (co)polymer, a star (co)polymer, a telechelic (co)polymer, or a combination thereof.

Aspect 22. The dispersion of Aspect 21, wherein the dispersion has an instability index of less than 0.5.

Aspect 23. The dispersion of Aspects 21 or 22, wherein the graphenic carbon nanoparticles comprise greater than 3 weight percent based on the total weight of the dispersion.

Aspect 24. The dispersion of any of Aspects 21-23, wherein the instability index is less than 0.3.

Aspect 25. The dispersion of any of Aspects 21-24, wherein the polymeric dispersant comprises an addition polymer comprising the residue of an alkyl ester of (meth)

18 acrylic acid containing from 8 to 22 carbon atoms in the alkyl group, a vinyl heterocyclic amide, or combinations thereof.

Aspect 26. The dispersion of Aspect 25, wherein the alkyl ester of (meth)acrylic acid containing from 8 to 22 carbon atoms in the alkyl group comprises lauryl methacrylate or stearyl acrylate.

Aspect 27. The dispersion of any of Aspects 26-26, wherein the vinyl heterocyclic amide comprises vinyl pyrrolidone.

Aspect 28. The dispersion of any of Aspects 21-27, wherein the graphenic carbon nanoparticles are thermally produced at a temperature of at least 3,500° C.

Aspect 29. The dispersion of any of Aspects 21-28, wherein the graphenic carbon nanoparticles have an average aspect ratio of greater than 3:1 and a Raman 2D: G peak ratio of at least 1:1.

Aspect 30. The dispersion of any of Aspects 21-29, wherein the graphenic carbon particles are turbostratic and have a B.E.T. specific surface area of at least 70 square meters per gram.

Aspect 31. The dispersion of any of Aspects 21-30, wherein the graphenic carbon nanoparticles are milled.

Aspect 32. The dispersion of any of Aspects 21-31, wherein the organic solvent comprises oil, N-methyl-2-pyrolidone, benzyl alcohol, diethylene glycol monoethyl ester (DE) acetate, and/or triethyl phosphate.

Aspect 33. The dispersion of any of Aspects 21-31, wherein the organic solvent comprises oil.

Aspect 34. The dispersion of any of Aspects 21-31, wherein the organic solvent comprises N-methyl-2-pyrolidone.

Aspect 35. The dispersion of any of Aspects 21-34, wherein a weight ratio of the graphenic carbon nanoparticles to the dispersant resin is from 0.5:1 to 15:1.

Aspect 36. A method of dispersing graphenic carbon nanoparticles in a solvent comprising mixing a dispersant resin into the solvent, wherein the dispersant resin comprises an addition polymer comprising a homopolymer, a block (co)polymer, a random (co)polymer, an alternating (co) polymer, a graft (co)polymer, a brush (co)polymer, a star (co)polymer, a telechelic (co)polymer, or a combination thereof; and mixing the graphenic carbon nanoparticles into the solvent and dispersant resin mixture.

Aspect 37. The method of Aspect 36, wherein the addition polymer comprises the residue of a vinyl heterocyclic amide.

Aspect 38. The method of Aspects 36 or 37, further comprising milling the graphenic carbon nanoparticles prior to the mixing of the graphenic carbon nanoparticles into the solvent and dispersant resin mixture.

Aspect 39. The method of any of Aspects 36-38, wherein the graphenic carbon nanoparticles have an average aspect ratio of greater than 3:1 and a Raman 2D:G peak ratio of at least 1:1.

Aspect 40. A dispersion made by the method of any of Aspects 36-39.

Aspect 41. The dispersion of Aspect 40, wherein the dispersion comprises a dispersion according to any of Aspects 1-35.

Aspect 42. A lubricant comprising a dispersion according to any of Aspects 1-36.

Aspect 43. The lubricant of Aspect 42, wherein the lubricant comprises a base oil; a dispersant resin comprising an addition polymer comprising the residue of a vinyl heterocyclic amine, a homopolymer, a block (co)polymer, a random (co)polymer, an alternating (co)polymer, a graft (co)polymer, a brush (co)polymer, a star (co)polymer, a telechelic (co)polymer, or a combination thereof; and graphenic carbon nanoparticles dispersed in the base oil.

Aspect 44. A lithium ion battery electrode slurry comprising a lithium-containing active material or lithium-reactive particles; and a dispersion according to any of Aspects 1-35.

Aspect 45. A lithium ion battery electrode made from the lithium ion battery electrode slurry of Aspect 44.

The following Examples are intended to illustrate various aspects of the present invention and are not intended to limit the scope of the invention.

Example 1

Two grams of graphenic carbon nanoparticles (GNP) powder commercially available from Raymor produced in accordance with the teachings of U.S. Pat. No. 8,486,364 was added into a 100 mL plastic cup (FlackTek Inc) with 6 zirconium oxide beads (5 mm, very high-density zirconium oxide, 95% ZrO2, 5% Y2O3, Glen Mills). The sample was mixed on a FlackTek speedmixer (DAC 600.1 FVZ) at 2350 rpm for 8 min at 2 min intervals. The grinding beads were then removed from the container. For larger quantities, 25 grams of graphenic carbon nanoparticles were added into a 500 mL plastic cup with 20 beads and mixed on the speedmixer at 2350 rpm for 8 min at 2 min intervals. The powder samples were then collected for analytical characterization and dispersion preparation. Deionized water may optionally be added to the graphenic carbon nanoparticles in the container, e.g., mist of DI water may be sprayed onto graphenic carbon nanoparticle powder in the plastic cup, with water levels ranging from 0% to 99.9%. The water wetted GNP samples may then be mixed on a speedmixer with grinding beads at the same conditions described above.

After preparation of the GNP samples through speedmixer mixing as described in Example 1, the samples were formulated into dispersions in various aqueous and organic solvents. Milled graphenic carbon nanoparticle dispersions can be prepared using various milling techniques including speedmixer, Cowles blade, and Eiger Mill milling.

Example 2

In a speedmixer dispersion, 0.34% dispersant resin (50% solids) listed in Table 1 was first added into a base oil solvent in a plastic cup. The sample was mixed on the speedmixer with 6 zirconium oxide beads for 4 minutes, or longer if needed, until the resin was completely dissolved. After that, 0.50% of pre-milled graphene powder prepared from Example 1 was added into the cup with resin-solvent mixture and mixed on the speedmixer again at 2350 rpm for another 8 minutes. This procedure was repeated, except commercially available exfoliated graphene sold under the designation M25 from XG Sciences was substituted for the graphenic carbon nanopowder of Example 1. The weight percent of each component in a standard base oil dispersion formula is listed in Table 1. The instability index of each dispersion is measured to be 0.201 at 1500 rpm, 313 RCA (relative centrifugal acceleration), 25 C, 5 min using the LUMiSizer. FIG. 1 is a graph of instability index versus time for the oil dispersions of Table 1 containing milled plasma graphenic carbon particles and milled exfoliated graphenic carbon particles at 0.5% graphene loading with a graphene-to-resin ratio of 10. FIG. 1 shows that milled plasma graphene dispersions exhibit significantly lower instability index and better stability than milled commercially available exfoliated graphene dispersions at the same formulation.

TABLE 1

| Composition of GNP dispersion in oil (weight %) | | |
|---|---|---|
| Component | | |
| GNP | 0.50 | 0 |
| M25 Graphene | 0 | 0.50 |
| Dispersant Resin* | 0.17 | 0.17 |
| Oil Solvent** | 99.33 | 99.33 |

*Dispersant Resin: copolymer of lauryl methacrylate and vinyl pyrrolidone
**Oil Solvent: various types of oil solvent, including, but not limited to, bar & chain oil, cutting oil, gear oil, hydraulic oil, air compressor oil, air tool oil, etc.

While the solid-state pre-milling process was effective in improving the dispersion quality of the thermally produced turbostratic graphenic carbon nanoparticles, no significant improvement in dispersion quality was noticed when the same milling process was applied to the commercially available exfoliated graphene M25.

Example 3

In a speedmixer dispersion, 7.7% polyvinylpyrrolidone (PVP) was first added into DI water in a plastic cup. The sample was mixed on the speedmixer with 6 zirconium oxide beads for 4 minutes, or longer if needed, until the resin is completely dissolved. After that, 23% of pre-milled GNP powder prepared in Example 1 was added into the cup with a PVP dispersant and solvent mixture, and mixed on the speedmixer again at 2350 rpm for another 8 min. The weight percent of each component in a standard aqueous dispersion formula is listed in Table 2.

TABLE 2

| Waterborne Graphene Dispersion | |
|---|---|
| Component | Weight % |
| DI Water | 69.3% |
| PVP* | 7.7% |
| GNP | 23% |

*PVP, polyvinylpyrrolidone, CAS# 9003-39-8, Mw = 10,000, Sigma Aldrich

Example 4

In a Cowles blade dispersion, 7.7% of polyvinylpyrrolidone (PVP) was first added into DI water while mixing with a Cowles blade. Once the resin was fully dissolved, 23% of pre-milled GNP powder prepared from Example 1 GNP was gradually added while aggressively stirring with a Cowles blade, starting at 500 RPM and steadily increasing up to 2000 RPM as needed. The mixture was then mixed on a Cowles blade for 30 minutes, or longer if needed. The weight percent of each component in a standard aqueous dispersion formula is listed in Table 3 and Table 4. The instability index of a dispersion in Table 3 prepared using this process is measured to be 0.335 at 4000 rpm, 2201 RCA, 25 C, 20 min using LUMiSizer. The instability index of a dispersion in Table 4 prepared using this process is measured to be 0.582.

TABLE 3

Waterborne Graphene Dispersion

| Component | Weight % |
| --- | --- |
| DI Water | 69.3% |
| PVP* | 7.7% |
| GNP | 23% |

*PVP, polyvinylpyrrolidone, CAS# 9003-39-8, Mw = 10,000, Sigma Aldrich

Example 5

In an Eiger Mill dispersion, a pre-dispersion was first made with a Cowles blade. The resin was added to the water or solvent while mixing with a high lift or Cowles blade. Once the resin was fully dissolved, the GNP was gradually added while aggressively stirring with a Cowles blade, starting at 500 RPM and steadily increasing up to 2000 RPM as needed. The pre-dispersed formula was then milled using an Eiger Mill with 1-1.2 mm Zirconox Milling Media to a residence time of 20 minutes to further decrease the particle size. The weight percent of each component in standard aqueous dispersion formulas is listed in Table 3 and Table 4. The instability index of a dispersion in Table 3 is measured to be 0.080 at 4000 rpm, 2201 RCA (relative centrifugal acceleration), 25° C., 20 min using LUMiSizer. The instability index of a dispersion in Table 4 is measured to be 0.511 at 4000 rpm, 2201 RCA, 25 C, 20 min using LUMiSizer. FIG. 2 is a graph of instability index versus time for aqueous dispersions containing milled plasma graphenic carbon particles (20% graphene loading) and milled exfoliated graphenic carbon particles (8% graphene loading) with a graphene-to-resin ratio of 3. This figure shows that milled plasma graphene dispersions at 20% exhibit significantly lower instability index and better stability than milled exfoliated graphene dispersions at 8%.

TABLE 4

Waterborne Graphene Dispersion

| Component | Weight % |
| --- | --- |
| DI Water | 89.3% |
| PVP* | 2.7% |
| GNP | 8% |

*PVP, polyvinylpyrrolidone, CAS# 9003-39-8, Mw = 10,000, Sigma Aldrich

Example 6

A composition was prepared with the components listed in Table 5.

TABLE 5

| Component | A (% WT) | B (% WT) |
| --- | --- | --- |
| DI Water | 86.6% | 89.3% |
| [4]PVP | 3.4% | 2.7% |
| [5]GNP | 10% | 8% |

[4]PVP-polyvinylpyrrolidone, CAS# 9003-39-8, from Sigma Aldrich
[5]thermally produced graphenic carbon particles, produced in accordance with the method disclosed in U.S. Pat. No. 8,486,364, measured BET surface area of at least 300 m²/g, average number of layers is 7, flake size 150-200 nm, commercially available as PureWave Graphene (GNP) from Raymor NanoIntgris The components in Table 5 make up the waterborne (wb) graphenic carbon nanoparticle pre-dispersion formula. First, the PVP was added to the water while mixing with a high lift or cowles blade. Once the PVP was fully dissolved in the water, the GNP was gradually added while aggressively stirring with a cowles blade, starting at 500 RPM and steadily increasing up to 2000 RPM as needed. The pre-dispersed formula from Table 5 was milled using an Eiger Mill with 1-1.2 mm Zirconox Milling Media to a residence time of 20 minutes to decrease the particle size to less than 1 μm.

The pre-dispersions and milled dispersions from Table 5 were analyzed for particle size, instability, and rheology, as shown in Table 6.

TABLE 6

| Component | A (pre) | A (milled) | B (pre) | B (milled) |
| --- | --- | --- | --- | --- |
| [6]Particle Size (μm) | 5.9 | 0.385 | 14.4 | 0.152 |
| [7]Instability Index (at 20 min.) | n/a | 0.341 | 0.495 | 0.177 |
| [8]Viscosity at 0.01 s⁻¹ Shear (cP) | 13600000 | 227000 | 14700000 | 7000 |
| [8]Viscosity at 1000 s⁻¹ Shear (cP) | 400 | 57.3 | 255 | 29.5 |

[6]Particle Size-measured through Mastersizer 2000, an analytical technique used to measure particle size distribution, from Melvern Instruments
[7]Instability Index-measured through LUMiSizer, an analytical technique used to accelerate instability, from LUM GmbH, measured at 4000 rpm for 60 seconds
[8]Viscosity at High and Low Shear-measured with Anton Paar Rheometer, from Anton Paar

Example 7

In a Cowles blade dispersion, 40% LMA-VP resin (50% solids) was first added into a base oil solvent while mixing with a Cowles blade. Once the resin was fully dissolved, 20% of pre-milled graphene powder prepared from Example 1 was gradually added while aggressively stirring with a Cowles blade, starting at 500 RPM and steadily increasing up to 2000 RPM as needed. The mixture was then mixed on a Cowles blade for 30 min, or longer if needed. The weight percent of each component in a standard dispersion formula is listed in Table 7.

TABLE 7

Composition of GNP dispersion in oil

| Component | Weight % |
| --- | --- |
| GNP | 20 |
| Dispersant Resin* | 20 |
| Solvent from Resin | 20 |
| Oil Solvent** | 40 |

*Dispersant Resin: copolymer of lauryl methacrylate and vinyl pyrrolidone
**Oil Solvent: Various types of oil solvent, including, but not limited to, bar & chain oil, cutting oil, gear oil, hydraulic oil, air compressor oil, air tool oil, etc.

Example 8

In a speedmixer dispersion, 0.5% polyvinylpyrrolidone (PVP) was first added into N-methyl-2-pyrrolidone (NMP) in a plastic cup. The sample was mixed on the speedmixer with 6 zirconium oxide beads for 4 minutes, or longer if needed, until the resin is completely dissolved. After that, 5% of pre-milled graphene powder prepared from Example 1 was added into the cup with resin-solvent mixture, and mixed on the speedmixer again at 2350 rpm for another 8 min. The weight percent of each component in a standard aqueous dispersion formula is listed in Table 8.

TABLE 8

| Composition of GNP dispersion in N-methyl-2-pyrrolidone (NMP) | |
| --- | --- |
| Component | Weight % |
| GNP | 5% |
| PVP* | 0.5% |
| NMP** | 94.5% |

*PVP, polyvinylpyrrolidone, CAS# 9003-39-8, Mw = 10,000, Sigma Aldrich
**NMP, N-methyl-2-pyrrolidinone, CAS# 872-50-4, anhydrous, 99.5%, Sigma Aldrich Example 9

Compositions were prepared with the components listed in Table 9.

TABLE 9

| % WT | C | D | E |
| --- | --- | --- | --- |
| 95% | [9]NMP | NMP | NMP |
| 0.5% | PVP | [10]SAR Resins | [11]PSII |
| 4.5% | TGC | TGC | TGC |

[9]NMP-N-Methyl-2-pyrrolidone, CAS#872-50-4, from Sigma Aldrich
[10]SAR Resins-acrylic resins from PPG
[11]PSII-acrylic resin from PPG The components in Samples C, D, and E from Table 9 make up the solvent borne graphenic carbon nanoparticle dispersion formulas. For Sample C, the PVP was added to NMP while mixing with a cowles blade. Once the PVP was fully dissolved in NMP, the TGC was gradually added while aggressively stirring with a cowles blade, starting at 500 RPM and steadily increasing up to 2000 RPM as needed. The pre-dispersed Sample C formula was milled using an Eiger Mill with 1-1.2 mm Zirconox Milling Media to a residence time of 20 minutes.

For Sample D, the SAR resins were added to NMP and mixed on FlackTek SpeedMixer at 2350 rpm for 5 min. The TGC was then added to the mixture, and mixed on Speed-Mixer at 2350 rpm for another 5 min. The mixing step was repeated as needed.

For Sample E, the PSII resin was added to NMP and mixed on FlackTek SpeedMixer at 2350 rpm for 5 min. The TGC was then added to the mixture, and mixed on Speed-Mixer at 2350 rpm for another 5 min. The mixing step was repeated as needed.

Figure 3:
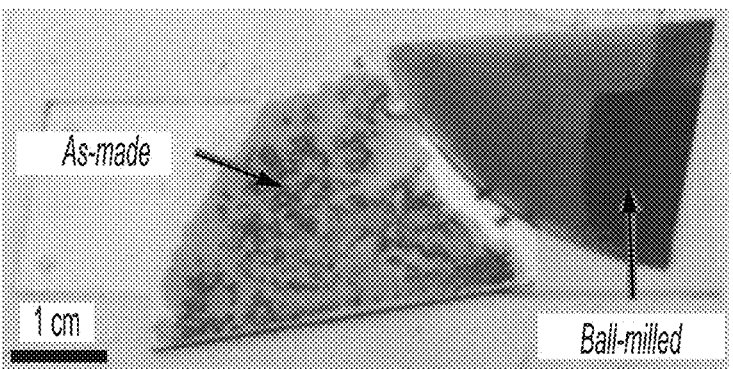
FIG. 3 is a photograph of dried graphenic carbon nanoparticle dispersions showing more uniform particle dispersion for milled graphenic carbon nanoparticles versus non-milled graphenic carbon nanoparticles.
Figure 4:
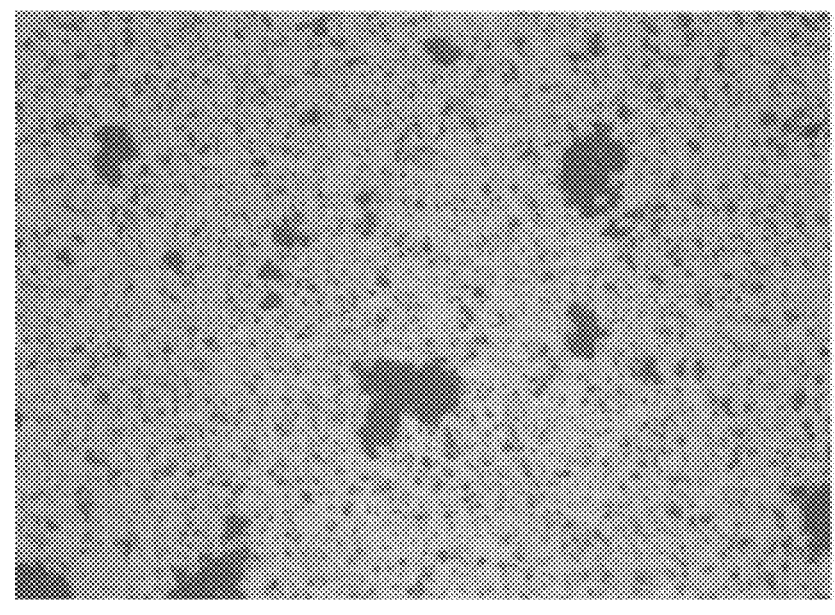
FIGS. 4 and 5 are a photomicrograph and a corresponding line drawing showing aggregated graphenic carbon nanoparticles of non-uniform sizes produced from a dispersion of non-milled graphenic carbon nanoparticles.
Figure 5:
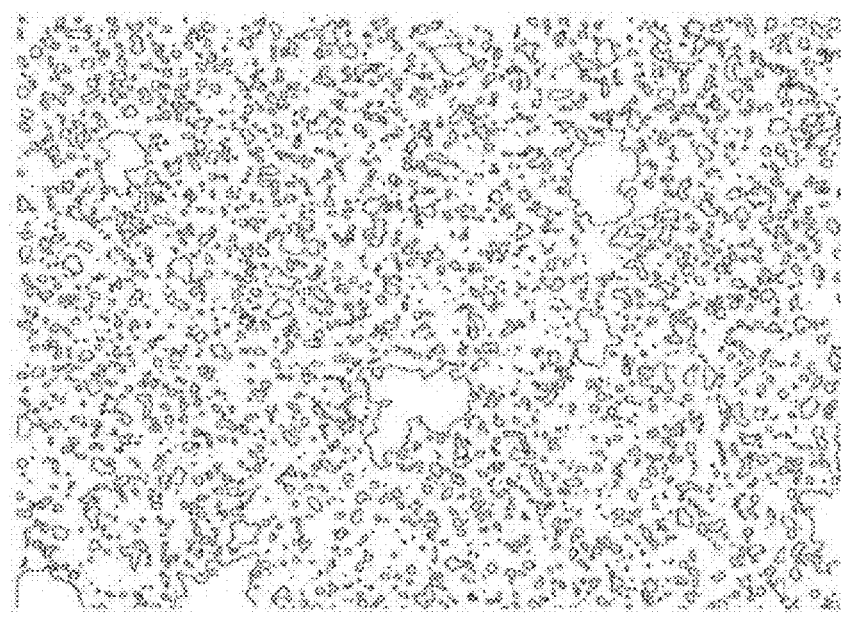
Figure 6:
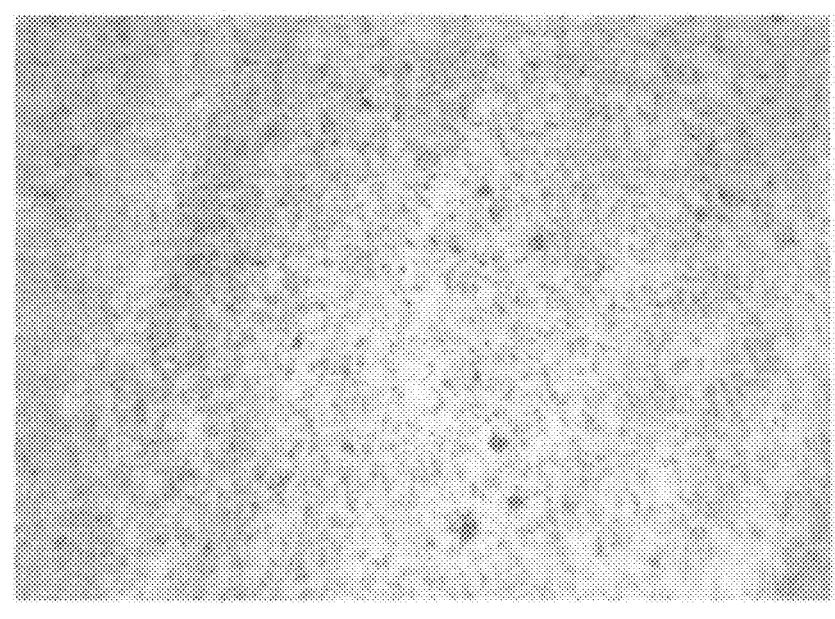
FIGS. 6 and 7 are a photograph and corresponding line drawing showing evenly dispersed non-aggregated graphenic carbon nanoparticles having uniform sizes produced from a dispersion of milled graphenic carbon nanoparticles.
Figure 7:
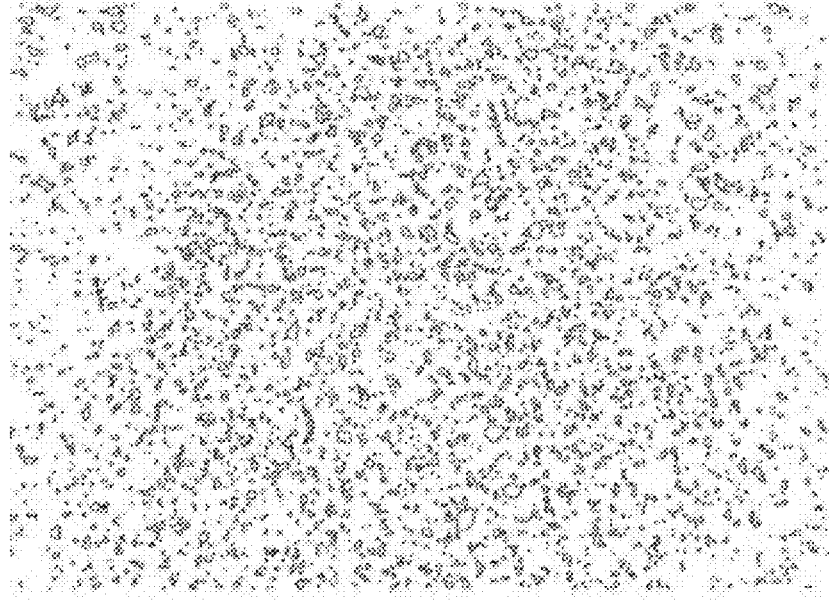

In order to better understand the dispersed material, in situ optical microscopy was used. In this case, the same concentration of graphene (0.5%), before and after milling, dispersed using the same dispersant (PVP 10:1 P/B) and solvent (NMP) similar to Example 8 above, were drop cast onto a glass slide. These were observed in-situ during solvent evaporation. Two qualitative observations could be made. First, there were many more micron-scale aggregates in the as-made graphene, which is shown in FIGS. 4 and 5, compared with the ball-milled, which is shown in FIGS. 6 and 7. The aggregates shown in FIGS. 4 and 5 grew in size as the solvent evaporated. This can also be readily seen with the naked eye when the same solutions were drop-cast onto silicon wafers, as shown in FIG. 3.

TABLE 10

| Average particle area based on FIG. 5 and FIG. 7 | | |
| --- | --- | --- |
| FIG. | Sample | Average Particle Area |
| 5 | Ball Milled GNP | 0.6 μm$^2$ |
| 7 | Non-milled GNP | 2.0 μm$^2$ |

Multiple analytical characterization techniques may be employed to monitor the material quality and determine if the desirable thermal and electrical properties of graphene are preserved after processing. Additionally, testing may be done to probe the physical changes induced by solid state milling in order to understand the structure-property relationships leading to enhanced dispersion quality and stability.

Figure 8:
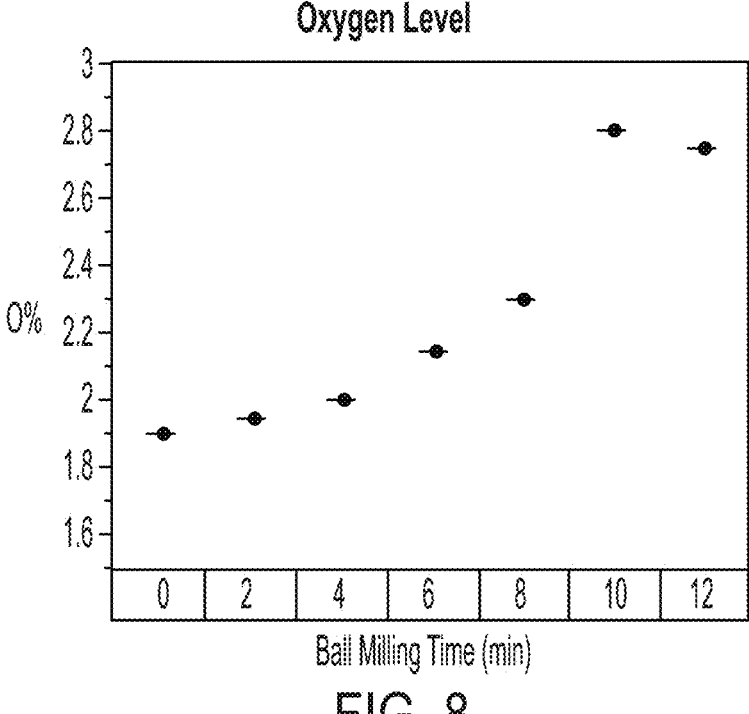
FIG. 8 is a graph of oxygen content versus milling time for graphenic carbon nanoparticle samples.
Figure 9:
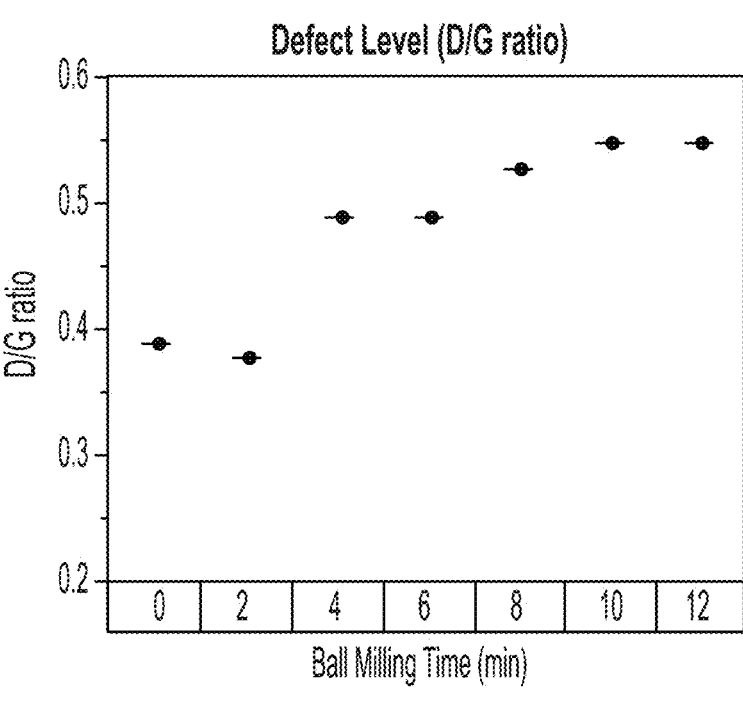
FIG. 9 is a graph of defect level versus milling time for graphenic carbon nanoparticle samples.
Figure 10:
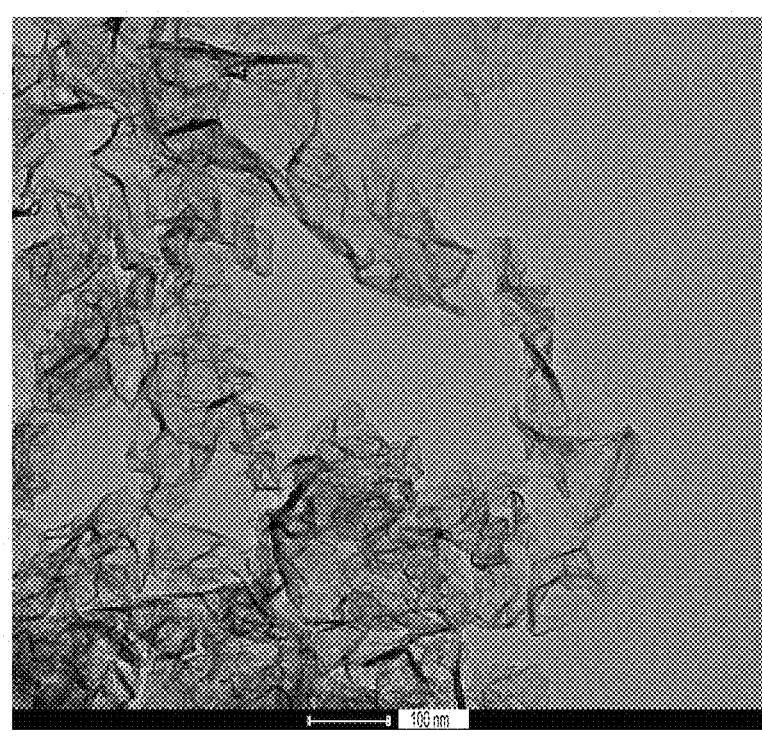
FIGS. 10 and 11 are TEM images of non-milled graphenic carbon nanoparticles and milled graphenic carbon nanoparticles, respectively.
Figure 11:
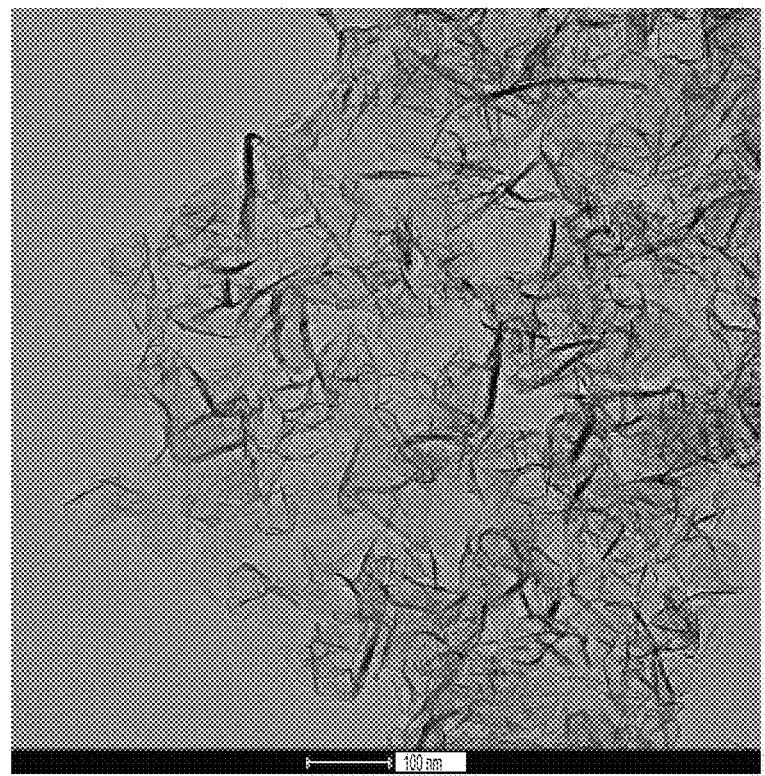

Raman, XPS and TEM may be used for monitoring material quality. These may be for testing the graphitic quality, purity and structure of the material. In the case of solid-state milling, Raman and XPS show some increase in defect density (FIG. 9) and oxygen incorporation (FIG. 8) as a function of milling time. Additionally, High magnification TEM shows the morphology of the individual graphenic carbon nanoparticles to be the same before (FIG. 10) and after (FIG. 11) milling.

An Anton-Paar rheometer with parallel plate geometry (1 mm gap and 50 mm diameter) was used to analyze the dispersion properties for the solutions similar to Example 7 with a systematic variation of GNP loading. Two types of GNPs with and without solid state milling process were primary difference between two series. NMP was used as a solvent and PVP (Mw-10000) was used as a polymeric binder and the composition was kept as 10% (in weight) with respect to GNP weight in the solution. The samples were stabilized at 25° C. for 5 mins before measurement. Dynamic frequency sweep measurements were conducted at a constant strain of 0.1% within the linear viscoelastic region (LVR) to investigate the dispersion structure as a function of GNP concentration, to precisely determine the GNP concentration at the transition from fluid to strong gel behavior.

Figures 12, 13, 14:
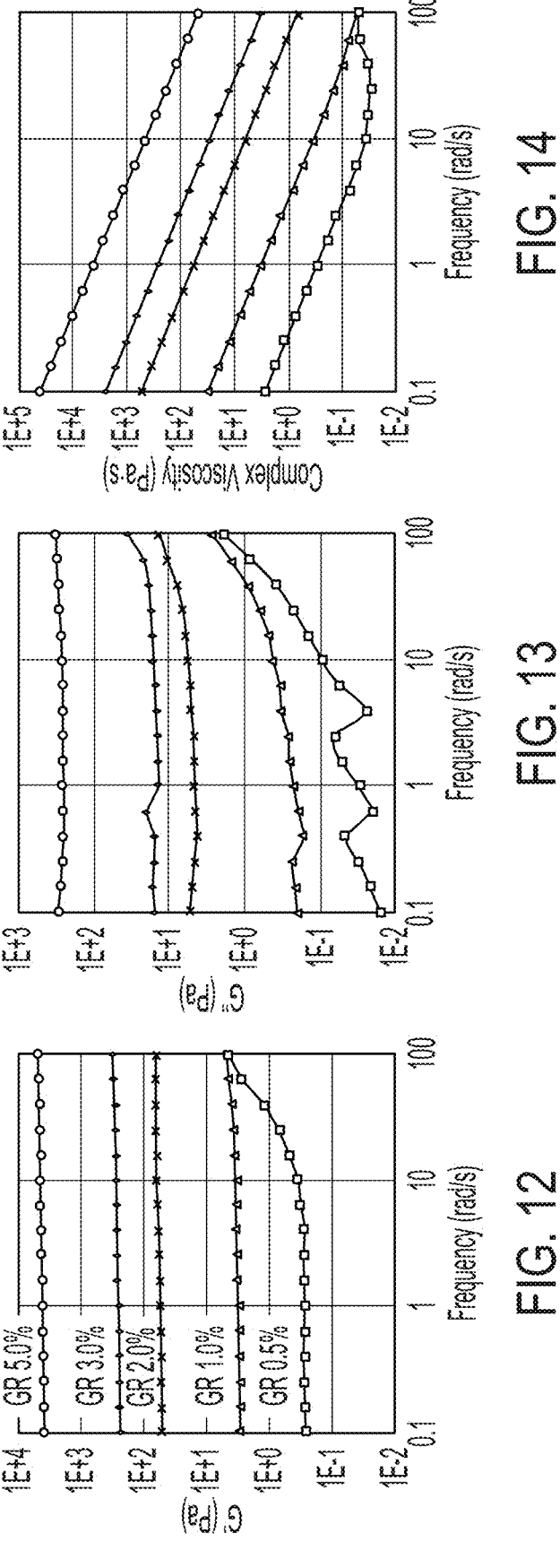
FIGS. 12-14 are dynamic frequency sweep results for dispersions containing varying loadings of non-milled graphenic carbon nanoparticles showing storage modulus (G'), loss modulus (G"), and complex viscosity, respectively.

FIGS. 12 and 13 show the frequency-dependence complex modulus (G' and G") and complex viscosity trend (FIG. 14) with pristine GNP concentration. Classic strong gel behavior can be determined by a dynamic frequency sweep measurement when the results are i) G' and G" values are frequency independent ii) viscosity decreases with a gradient of ~(−1) on the log-log plot at all applied frequencies. For the solution with the lowest concentration of 0.5% solution, the solution exhibited the viscoelastic response already close to strong gel behavior and all the solutions above 1% showed strong gel behavior.

Figures 15, 16, 17:
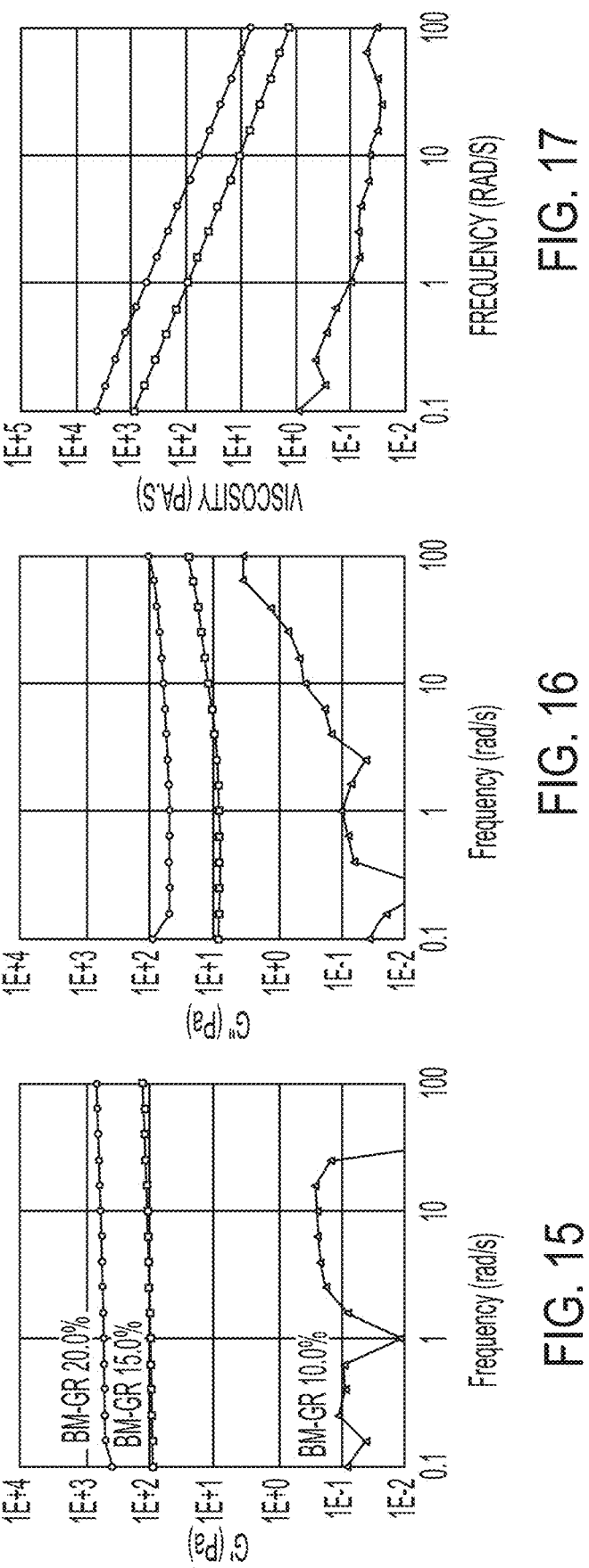
FIGS. 15-17 are dynamic frequency sweep results for dispersions containing varying loadings of milled graphenic carbon nanoparticles showing storage modulus (G'), modulus (G"), and complex viscosity, respectively.

For the series with solid state-milled GNP (FIGS. 15 and 16), the GNP concentration for strong gel behavior substantially was increased close to 15% compared with the solutions with pristine GNP (<1%). G' and G" were found to increase with the concentration, frequency-independent complex modulus (G' and G") values and the viscosity (FIG. 17) following a power law of ~(−1) in the log-log plot were observed for the samples with ball-milled GNP at the loading close to 15%.

The significant shift of GNP loading for fluid-strong gel transition from ~1% to ~15% realized by solid state-milling process. Conventional exfoliated graphene is known to have poor dispersion even with polymer binders in both organic and aqueous solutions, and strong gel behavior for similar systems has been reported with the graphene loading mostly below 1%. The slight improvement in dispersion is possible by introducing structural defect like oxygen for graphene oxide, but, so far, the highest graphene loading for strong gel state is still far below 5%.

Figure 18:
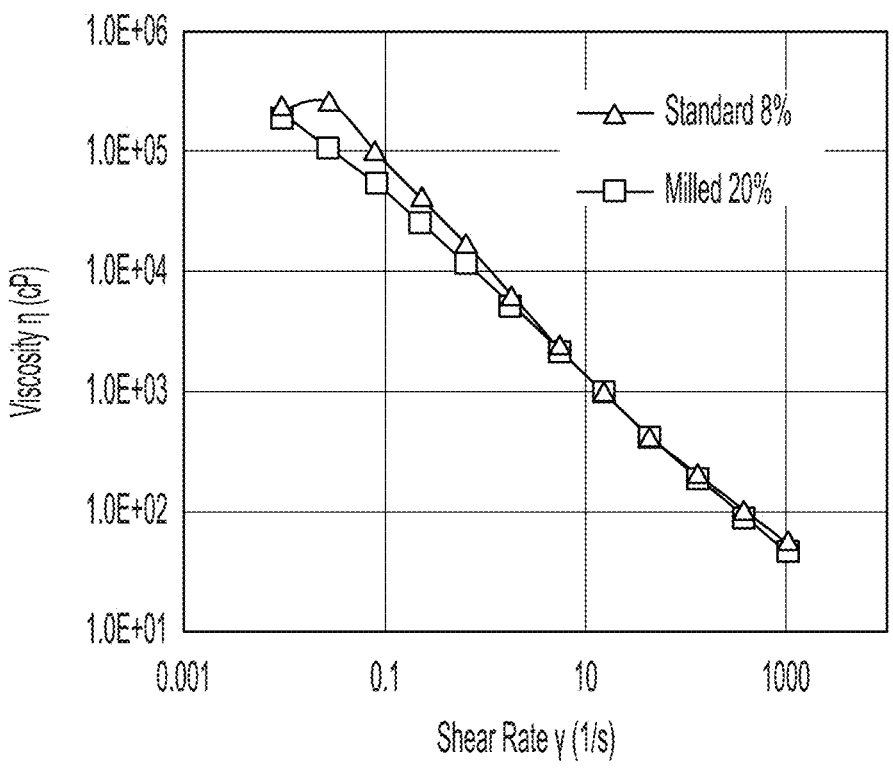
FIG. 18 includes plots of viscosity versus shear rate for aqueous graphenic carbon nanoparticle dispersions containing 8 weight percent non-milled graphenic carbon nanoparticles versus 20 weight percent milled graphenic carbon nanoparticles.

FIG. 18 is the flow curves of aqueous graphene dispersions. Comparing 8% pristine graphene dispersion with 20% solid-state milled graphene dispersion. This figure shows that solid state milling process could significantly increase the solids level of dispersions from 8% to 20% while maintaining comparable viscosity.

Figure 19:
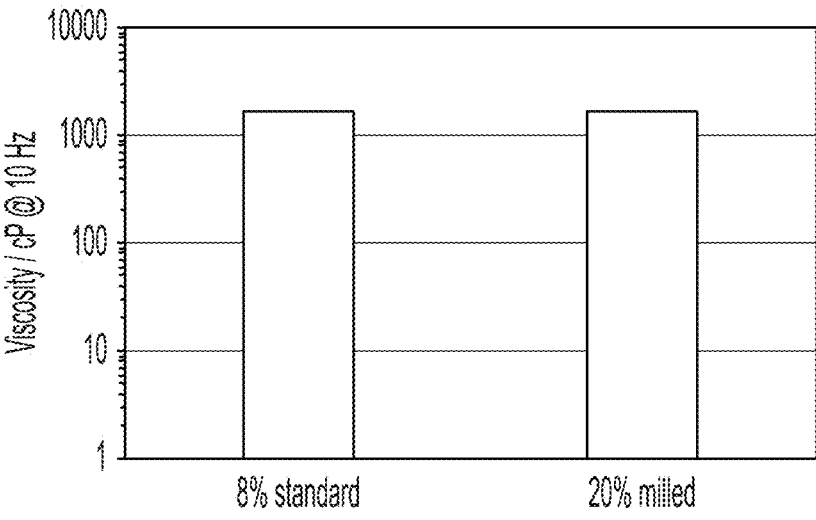
FIG. 19 shows viscosities of aqueous graphenic carbon nanoparticle dispersions at a shear rate of 10 Hz for dispersions containing 8 weight percent non-milled graphenic carbon nanoparticles versus 20 weight percent milled graphenic carbon nanoparticles.

FIG. 19 shows viscosity of graphenic carbon nanoparticle dispersions at a shear rate of 10 Hz for 8% pristine graphenic carbon nanoparticle dispersion with 20% solid-state milled graphenic carbon nanoparticle dispersion. This figure shows that solid state milling process could significantly increase the solids level of dispersions from 8% to 20% while maintaining comparable viscosity.

Figure 20:
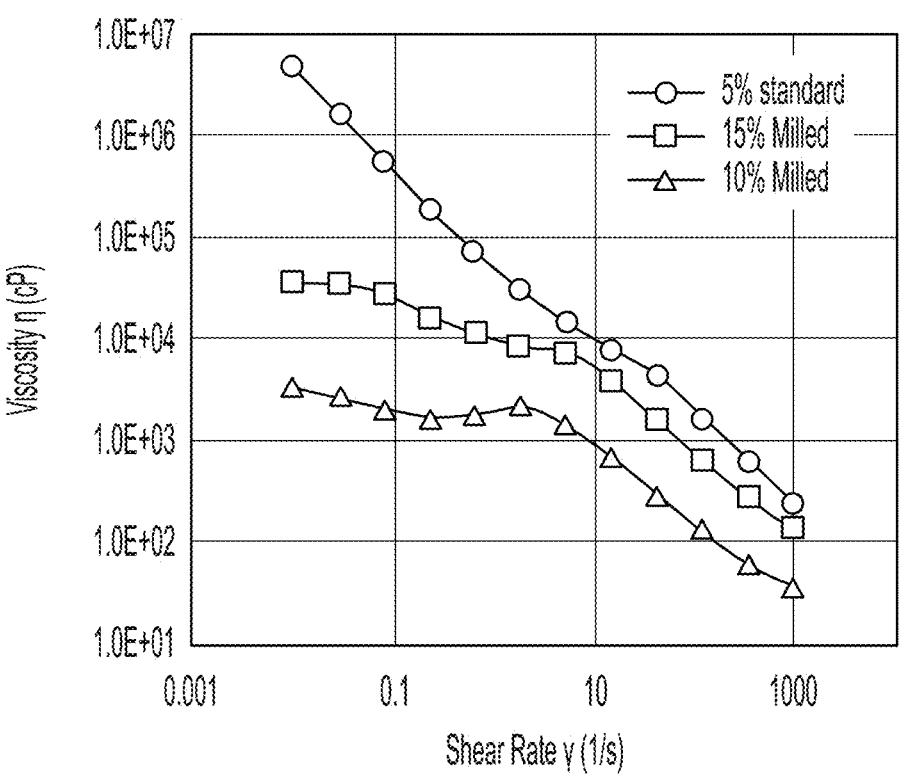
FIG. 20 includes plots of viscosity versus shear rates for graphenic carbon nanoparticle dispersions in organic solvent containing 5 weight percent non-milled graphenic carbon nanoparticles, 10 weight percent milled graphenic carbon nanoparticles and 15 weight percent graphenic carbon nanoparticles.

FIG. 20 shows curves of NMP dispersions comparing 5% pristine graphenic carbon nanoparticle dispersions with 10%, 15% solid-state milled dispersions. This figure shows that solid state milled dispersions at 10% and 15% exhibit lower viscosity than standard dispersions at 5%.

Figure 21:
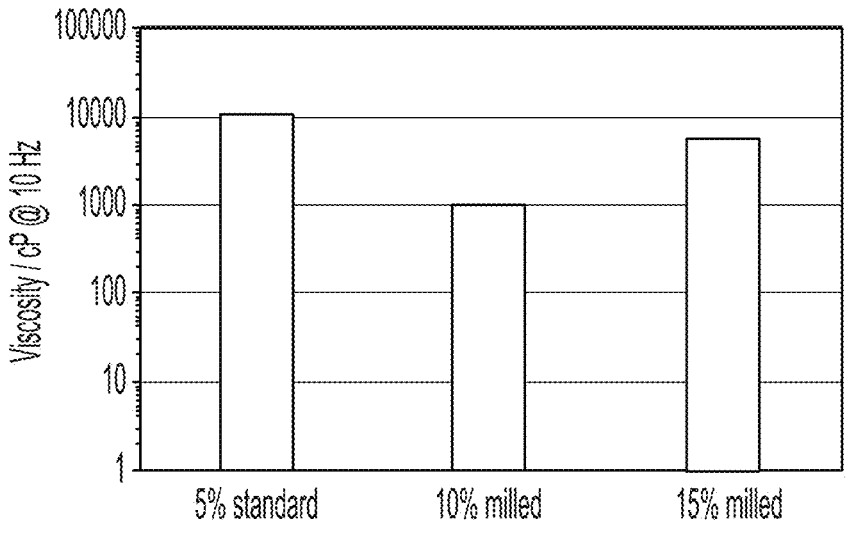
FIG. 21 shows viscosities of graphenic carbon nanoparticle dispersions in organic solvent at a shear rate of 10 Hz for dispersions in organic solvent containing 5 weight percent non-milled graphenic carbon nanoparticles, 10 weight percent milled graphenic carbon nanoparticles and 15 weight percent graphenic carbon nanoparticles.

FIG. 21 shows viscosity of graphenic carbon nanoparticle dispersions at a shear rate of 10 Hz for 5% pristine graphenic carbon nanoparticle dispersions and 10%, 15% solid-state milled graphenic carbon nanoparticle dispersions. This figure shows that solid state milled dispersions at 10% and 15% exhibit lower viscosity than standard dispersions at 5%.

It is clear that the dispersion quality of the GNP after solid state-milling improved an order of magnitude higher compared with that of pristine non-milled GNP.

Milled graphenic carbon nanoparticles were dispersed in hydrocarbon oil. It was discovered that solid state milling could not only improve graphenic carbon nanoparticle solids level, but also offer significant improvement in the quality and stability of graphenic carbon nanoparticle dispersions.

Figures 22, 23, 24:
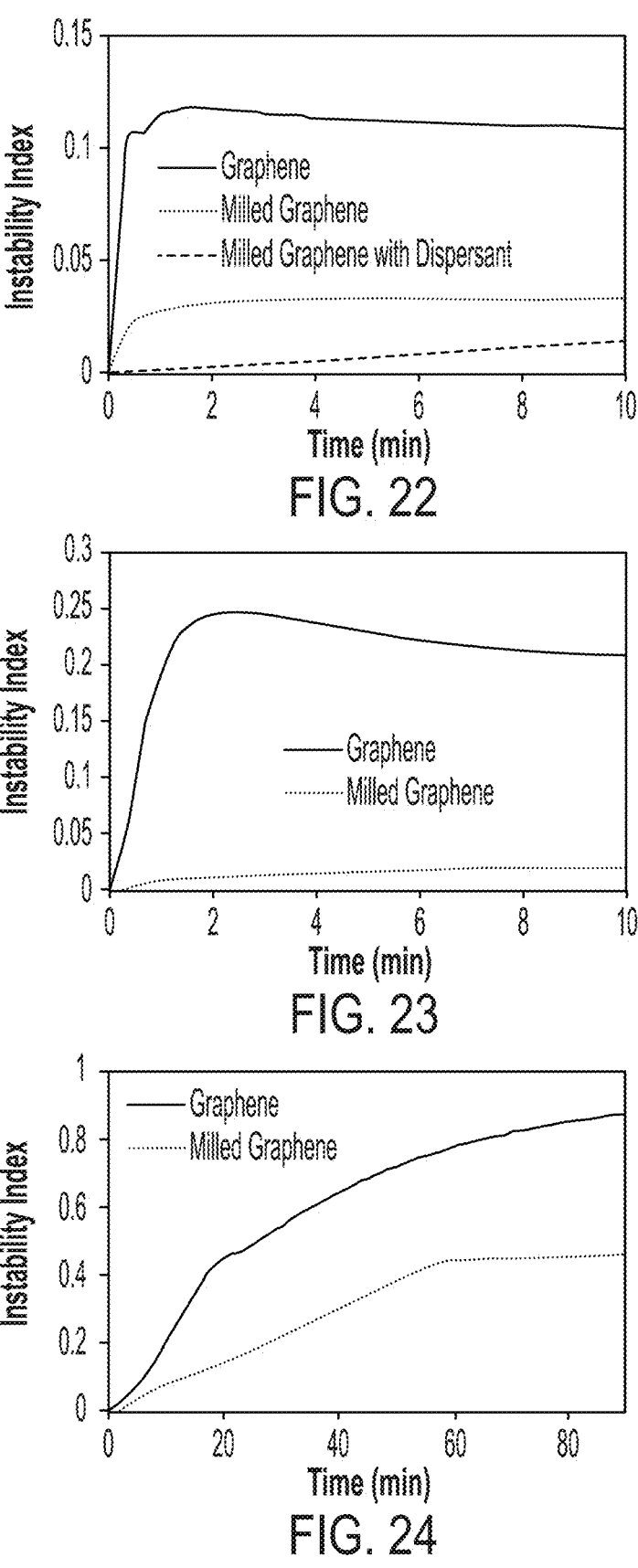
FIGS. 22-24 are graphs of instability index versus time for dispersions containing milled graphenic carbon nanoparticle dispersions and non-milled graphenic carbon nanoparticle dispersions.

As shown in the instability index plots in FIGS. 22, 23 and 24, the process of solid-state milling reduces the instability index compared to pristine non-milled graphenic carbon nanoparticle dispersions, making such dispersions more stable at both room temperature and elevated temperatures. The instability index of each dispersion is measured at 1500 rpm, 313 RCA (relative centrifugal acceleration) and 25 C using the LUMiSizer. Although FIGS. 22 and 23 only show times up to 10 minutes, the instability curves were stabilized at 10 minutes such that the instability indexes at 20 minutes would be substantially the same as shown at 10 minutes. The combination of milling and resin addition offered synergistic benefits to the stabilization of graphenic carbon nanoparticle dispersions.

Solid state milling of graphenic carbon may significantly increase the solid level and stability of graphenic carbon nanoparticles in dispersions, allowing the particles to be more effectively integrated in various solvent and aqueous systems. Raman and XPS may show some increase in defect density and oxygen incorporation as a function of milling time, and rheology studies show the fluid-strong gel transition increasing from 1% of dispersions made with pristine graphenic carbon nanoparticles to 15% of dispersions made with solid state milled graphenic carbon nanoparticles. Comparable battery performance (at 2.5 times higher solids level) in silicon anodes and better conductivity in LiFePO4 cathodes may be achieved with dispersions made with solid state milled graphenic carbon nanoparticles.

Alkyl-functionalized VP resins were evaluated as dispersants in an NMP formulation suitable for lithium-ion battery electrode manufacturing. In a typical dispersion formulation, dispersant resin (0.5 wt % on dispersion solids) was dissolved in NMP in a dual asymmetric centrifuge (DAC) cup. GNP powder (5.0 wt % on dispersion solids) was added to the NMP solution, and the cup was mixed for 8 minutes using the SpeedMixer DAC with six 5 mm ceramic mixing beads. The room temperature stability of each dispersion was then assessed by measuring instability index values using a LumiSizer® dispersion analyzer. It should be noted that lower instability index values correspond to increased dispersion stability.

Figure 25:
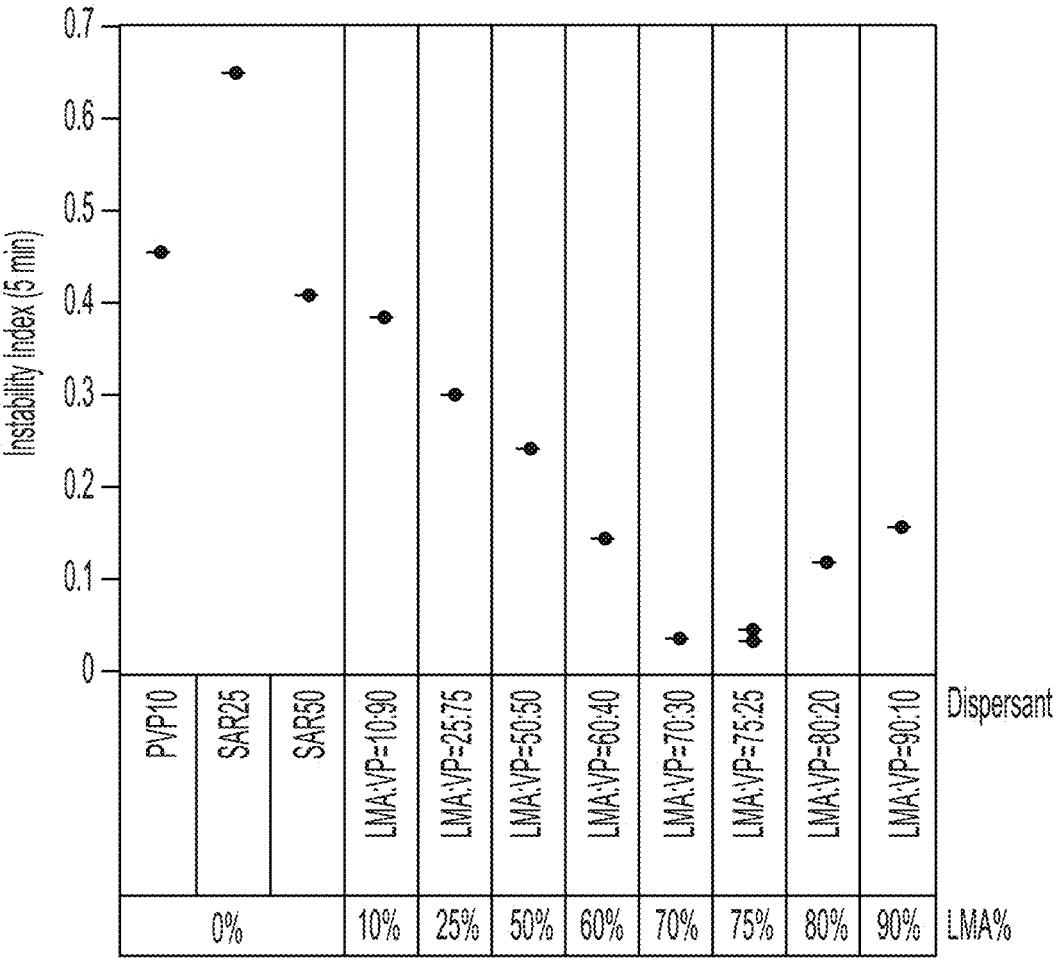
FIG. 25 shows instability index values for graphenic nanoparticle dispersions in different types of organic solvents including N-methyl-2-pyrrolidone (NMP), SAR acrylic resin, and copolymers of lauryl methacrylate and vinyl pyrrolidone (LMA-VP) with varying LMA content.

Copolymer resins were prepared with LMA content ranging from 10 to 90 wt % using 1-amylperoxy 2-ethylhexyl-carbonate (Trigonox 131) as a radical initiator and targeting initial $[M]_0:[I]_0$ ratios of 85:1. GNP dispersions were then prepared using the DAC mixing procedure described above, and instability index values for each resulting dispersion were measured. SAR dispersants were prepared by the free radical polymerization of methyl methacrylate, 2-hydroxy-ethyl acrylate, methacrylic acid, 2-ethylhexyl acrylate, and VP, using NMP as a suitable polymerization solvent. SAR25 and SAR50 were prepared with VP incorporations of 25 wt % and 50 wt %, respectively. As shown in FIG. 25, all of the LMA-VP copolymers afforded dispersions with lower room temperature instability index values compared to a commercial PVP control ($M_w$~10,000 g/mol) and SAR dispersants with 25 or 50 wt % VP. Increasing LMA content from 10 to 70 wt % led to a reduction in the dispersion instability index which reached a minimum when the dispersants contained 70 or 75 wt % LMA. These results suggest that LMA-VP copolymers containing 70-75 wt % LMA are optimal for dispersing and stabilizing GNPs in NMP.

As more fully described in the examples below, dispersing the graphenic carbon nanoparticles in a solution of N-methyl-2-pyrrolidone (NMP) containing polymeric resin comprising N-vinyl pyrrolidone copolymerized with lauryl methacrylate (P (LMA-co-VP)) at various ratios of N-vinyl pyrrolidone to lauryl methacrylate of 100:0 to 3:1, 1:1 and 1:3, caused a significant reduction in viscosity of the graphenic carbon nanoparticle dispersion as lauryl methacrylate content was increased and the total solids of the dispersion was held constant at 6 wt-%. Further, particle size of the graphenic carbon nanoparticles within the dispersion are generally observed to increase with an increasing lauryl methacrylate content versus total solids of the graphenic carbon nanoparticle dispersion. This result suggests that increased particle size due to the lauryl methacrylate content trends with decreasing viscosity of the graphenic carbon nanoparticle dispersion. Distribution of lauryl methacrylate and N-vinyl pyrrolidone within the polymeric resin as well as the molecular weight of the polymeric resin may also be a factor in overall particle size and viscosity of the dispersions.

Graphenic carbon nanoparticle dispersions in NMP using the polymeric resin dispersant containing various quantities of lauryl methacrylate and N-vinylpyrrolidone were used in a Li-ion battery cathode as the conductive additive, with $LiNi_{0.5}Mn_{0.3}Co_{0.2}O_2$ as the active material for Li-ion based energy storage and poly (vinylidene fluoride) as the binder, showing that the described graphenic carbon dispersant resins have little to no effect on the rate capability and cycle life within a coin cell format when included in a lithium ion battery electrode slurry composition. These results assure that graphenic carbon nanoparticle dispersions with lower viscosity using P (LMA-co-VP) at certain ratios of lauryl methacrylate and N-vinyl pyrrolidone can be used within an electrochemically active Li-ion cathode film without imparting a significantly observable decay in cycle life or rate capability of the cell in a coin cell format.

The increase of lauryl methacrylate within the dispersant resin allows the increase of total solids content within the graphenic carbon nanoparticle dispersion while achieving a desirable viscosity comparable to those using only poly (vinylpyrrolidone), abbreviated PVP, as the dispersant.

Example 10

A composition was prepared with the components listed in Table 11 under a $N_2$ blanket to protect from humidity. In a speedmixer dispersion, PVP dispersant resin was first added to NMP with 10 zirconium oxide beads and mixed for 2 minutes at 2000 rpm until fully dissolved/dispersed. Then, graphenic carbon nanoparticles (GNP) were added and mixed for a total of 8 minutes at 2000 rpm or until fully dispersed. The weight-percent of each component in a standard dispersion formula is listed in Table 11.

TABLE 11

| GNP Dispersions in NMP with PVP | | | |
|---|---|---|---|
| Component | Dispersion A (wt-%) | Dispersion B (wt-%) | Dispersion C (wt-%) |
| NMP* | 94.0 | 94.0 | 94.0 |
| GNP | 5.4 | 5.0 | 4.5 |
| PVP** | 0.6 | 1.0 | 1.5 |

*NMP, N-methyl-2-pyrrolidone, CAS#872-50-4, Anhydrous, 99.5%, Sigma Aldrich
**PVP, Polyvinylpyrrolidone, CAS# 9003-39-8, Mw = 10,000 g/mol, Sigma Aldrich

Example 11

A composition was prepared with the components listed in Table 12 under a $N_2$ blanket to protect from humidity. In a speedmixer dispersion, P (LMA-co-VP) was first added to NMP with 10 zirconium oxide beads and mixed for 2 minutes at 2000 rpm until fully dissolved/dispersed. Then, GNP was added and mixed for a total of 8 minutes at 2000 rpm or until fully dispersed. The weight-percent of each component in a standard dispersion formula is listed in Table 12.

TABLE 12

| GNP Dispersions in NMP with P(LMA-co-VP) | | | |
|---|---|---|---|
| Component | Dispersion A (wt-%) | Dispersion B (wt-%) | Dispersion C (wt-%) |
| NMP* | 94.0 | 94.0 | 94.0 |
| GNP | 5.4 | 5.0 | 4.5 |
| Resin 1** | 0.6 | 1.0 | 1.5 |

*NMP, N-vinylpyrrolidone, CAS#872-50-4, Anhydrous, 99.5%, Sigma Aldrich
**Resin 1-A copolymer of lauryl methacrylate and N-vinyl pyrrolidone, P(LMA-co-VP) at a ratio of 1-to-3 respectively dispersed in NMP, Mw = ~16,000 g/mol

Example 12

A composition was prepared with the components listed in Table 10 under a $N_2$ blanket to protect from humidity. In a speedmixer dispersion, P (LMA-co-VP) was first added to NMP with 10 zirconium oxide beads and mixed for 2 minutes at 2000 rpm until fully dissolved/dispersed. Then, GNP was added and mixed for a total of 8 minutes at 2000 rpm or until fully dispersed. The weight-percent of each component in a standard dispersion formula is listed in Table 13.

TABLE 13

| GNP Dispersions in NMP with P(LMA-co-VP) | | | |
|---|---|---|---|
| Component | Dispersion A (wt-%) | Dispersion B (wt-%) | Dispersion C (wt-%) |
| NMP* | 94.0 | 94.0 | 94.0 |
| GNP | 5.4 | 5.0 | 4.5 |
| Resin 2** | 0.6 | 1.0 | 1.5 |

*NMP, N-vinylpyrrolidone, CAS#872-50-4, Anhydrous, 99.5%, Sigma Aldrich
**Resin 2-A copolymer of lauryl methacrylate and N-vinyl pyrrolidone, P(LMA-co-VP) at a ratio of 1-to-1 respectively dispersed in NMP, Mw = ~31,000 g/mol

Example 13

A composition was prepared with the components listed in Table 14 under a $N_2$ blanket to protect from humidity. In a speedmixer dispersion, P (LMA-co-VP) was first added to NMP with 10 zirconium oxide beads and mixed for 2 minutes at 2000 rpm until fully dissolved/dispersed. Then, GNP was added and mixed for a total of 8 minutes at 2000 rpm or until fully dispersed. The weight-percent of each component in a standard dispersion formula is listed in Table 14.

TABLE 14

| GNP Dispersions in NMP with P(LMA-co-VP) | | | |
|---|---|---|---|
| Component | Dispersion A (wt-%) | Dispersion B (wt-%) | Dispersion C (wt-%) |
| NMP* | 94.0 | 94.0 | 94.0 |
| GNP | 5.4 | 5.0 | 4.5 |
| Resin 3** | 0.6 | 1.0 | 1.5 |

*NMP, N-vinylpyrrolidone, CAS#872-50-4, Anhydrous, 99.5%, Sigma Aldrich.
**Resin 3-A copolymer of lauryl methacrylate and N-vinyl pyrrolidone, P(LMA-co-VP) at a ratio of 3-to-1 respectively dispersed in NMP, Mw = ~35,000 g/mol

Example 14

A composition was prepared with the components listed in Table 15 under a $N_2$ blanket to protect from humidity. In a speedmixer dispersion, P (LMA-co-VP) was first added to NMP with 10 zirconium oxide beads and mixed for 2 minutes at 2000 rpm until fully dissolved/dispersed. Then, GNP was added and mixed for a total of 8 minutes at 2000 rpm or until fully dispersed using 4×2-minute incremental mixing steps. The weight-percent of each component in a standard dispersion formula is listed in Table 15.

TABLE 15

| GNP Dispersions in NMP with P(LMA-co-VP) | | | |
|---|---|---|---|
| Component | Dispersion A (wt-%) | Dispersion B (wt-%) | Dispersion C (wt-%) |
| NMP* | 94.0 | 94.0 | 94.0 |
| GNP | 5.4 | 5.0 | 4.5 |
| Resin 4** | 0.6 | 1.0 | 1.5 |

*NMP, N-vinylpyrrolidone, CAS#872-50-4, Anhydrous, 99.5%, Sigma Aldrich.
**Resin 4-A copolymer of lauryl methacrylate and N-vinyl pyrrolidone, P(LMA-co-VP) at a ratio of 3-to-1 respectively dispersed in N-amyl propanoate, Mw = ~43,000 g/mol

Example 15

Figure 26:
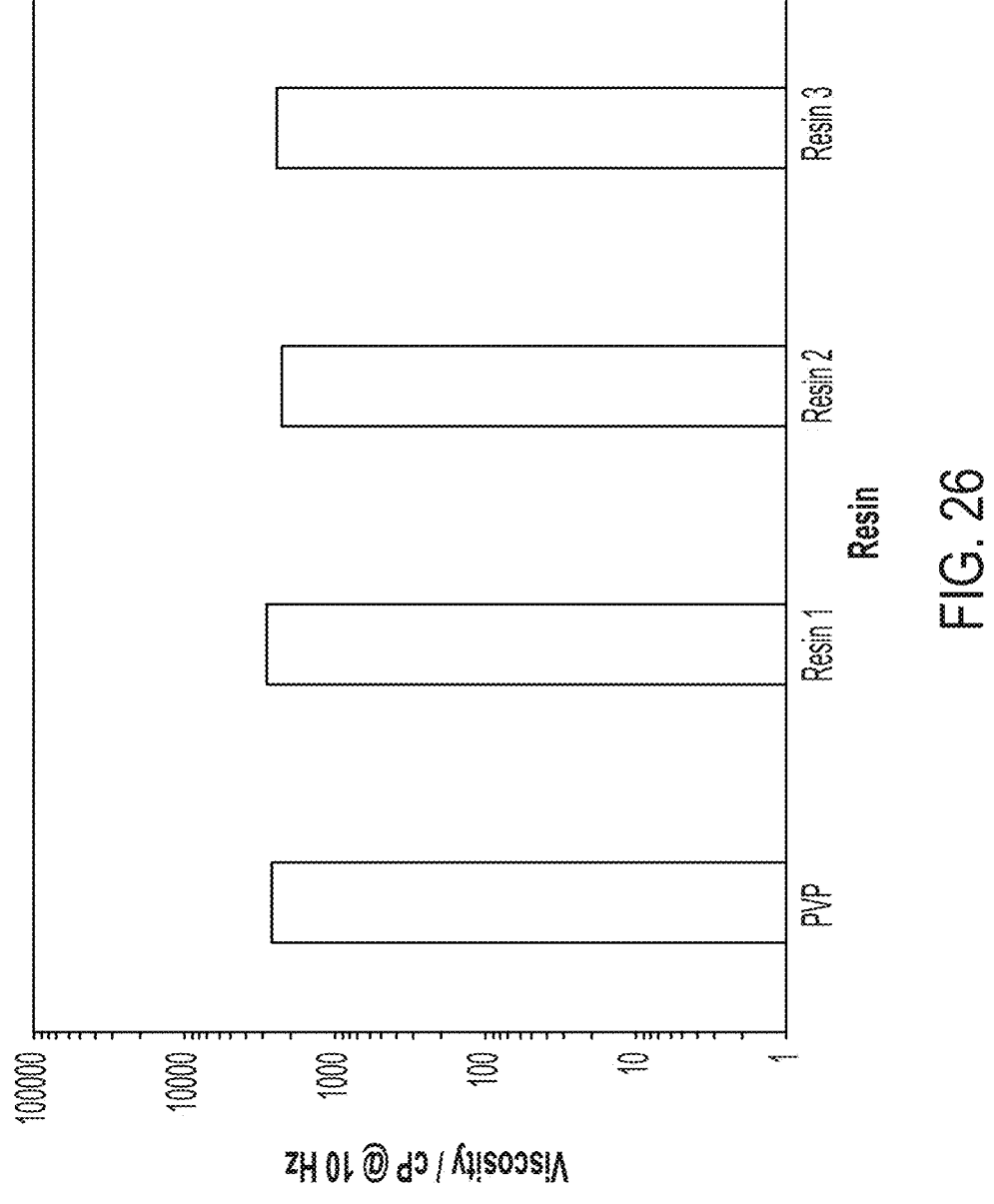
FIG. 26 shows viscosities of graphenic carbon nanoparticle dispersions at a shear rate of 10 Hz in PVP with LMA-VP dispersant resins of increasing lauryl methacrylate content.

In order to understand how the change in lauryl methacrylate content would impact the viscosity of the graphenic carbon nanoparticle dispersions at a low-level resin content, rheological measurements were collected using an Anton Paar MCR 302 and a CP50-1/TG measuring cone. Viscosity measurements at a shear rate of 10 Hz were used for comparison of dispersion rheology. Dispersions tested are described as Dispersion A in each of Examples 10, 11, 12 and 13 containing a graphene-to-resin ratio of 9. FIG. 26 shows little effect of the resin on the rheological properties of the graphenic carbon nanoparticle dispersions at this particular level of resin content.

Example 16

Figure 27:
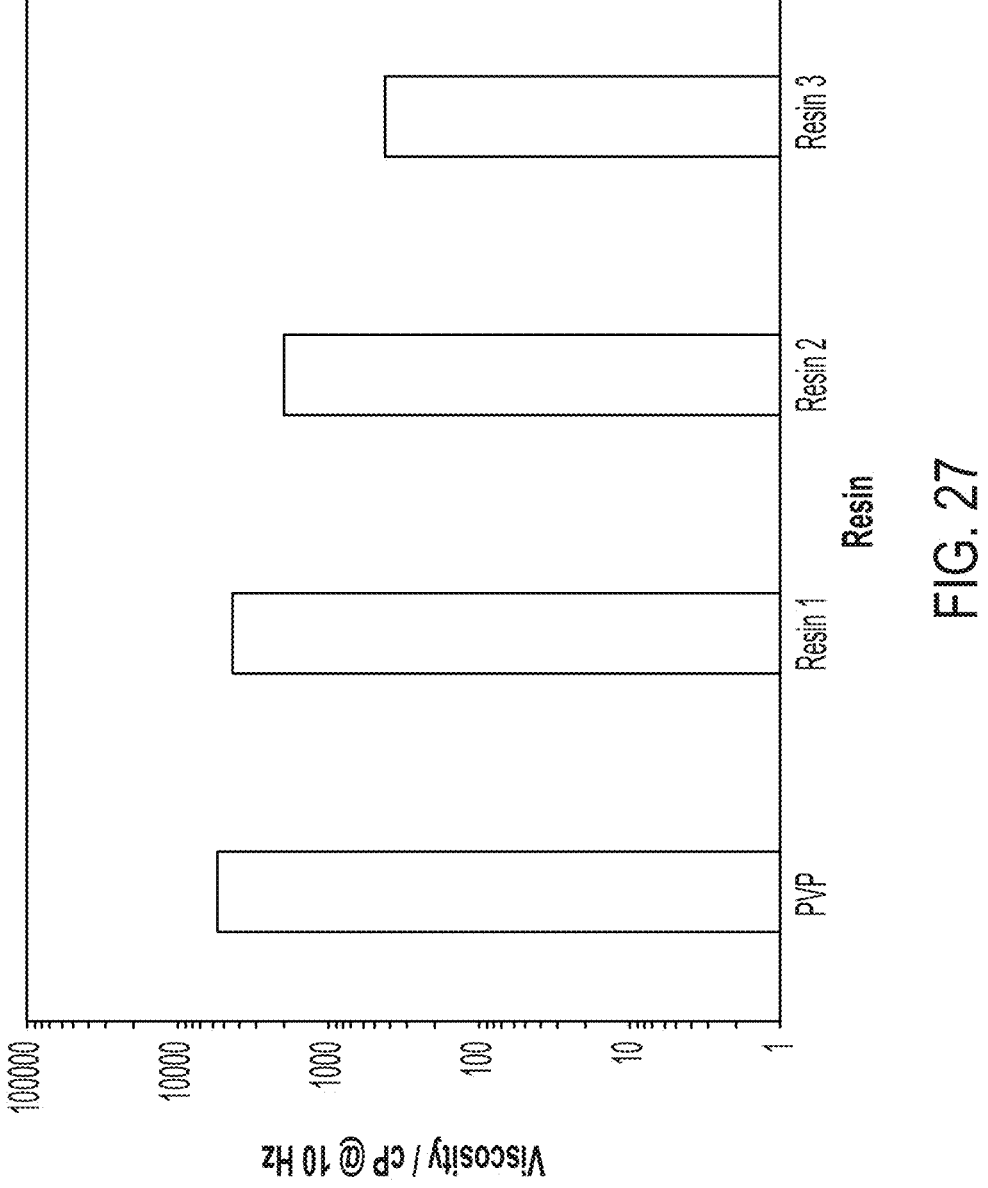
FIG. 27 shows viscosities of graphenic carbon nanoparticle dispersions at a shear rate of 10 Hz in PVP with LMA-VP dispersant resins of increasing lauryl methacrylate content.

In order to understand how the change in lauryl methacrylate content would impact the viscosity of the graphenic carbon nanoparticle dispersions at a medium-level resin content, rheological measurements were collected at a shear rate of 10 Hz from slurries described as Dispersion B in each of Examples 10, 11, 12 and 13 containing a graphenic carbon nanoparticle-to-resin ratio of 5. FIG. 27 shows a clear reduction of viscosity of the graphenic carbon nanoparticle dispersions as the lauryl methacrylate component is increased from 0% to 75% of the polymeric resin at this particular level of resin content. The increase in solids content may thus be lower than approximately 30% when using a graphene-to-resin ratio >5.

Example 17

Figure 28:
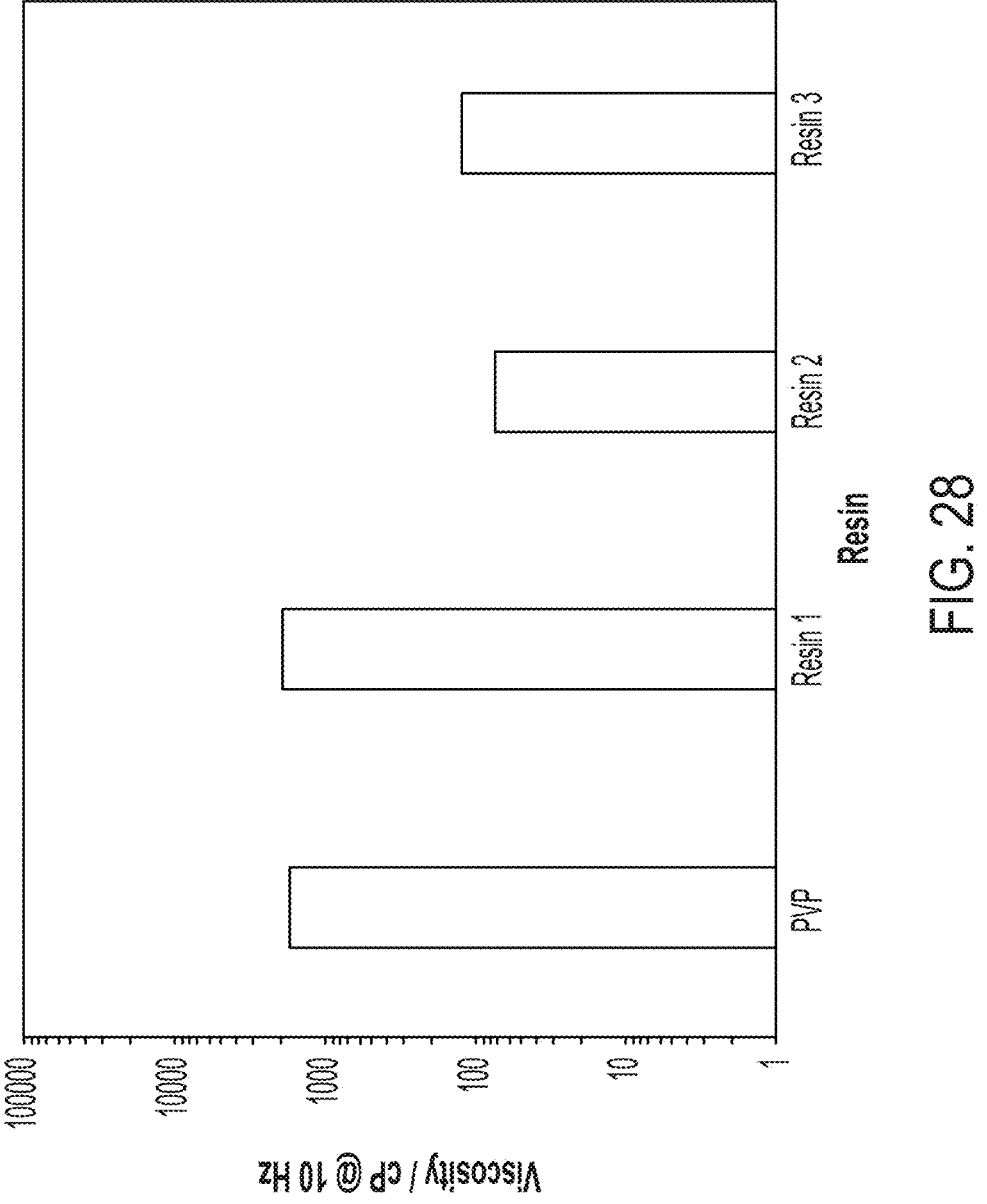
FIG. 28 shows viscosities of graphenic carbon nanoparticle dispersions at a shear rate of 10 Hz in PVP with LMA-VP dispersant resins of increasing lauryl methacrylate content.

In order to understand how the change in lauryl methacrylate content would impact the viscosity of the graphenic carbon nanoparticle dispersions at a high-level resin content, rheological measurements were collected at a shear rate of 10 Hz from slurries described as Dispersion C containing a graphenic carbon nanoparticle-to-resin ratio of 3. FIG. 28 shows a clear reduction of viscosity of the graphenic carbon nanoparticle dispersions as the lauryl methacrylate component is increased from 0% to 75% of the polymeric resin at this particular level of resin content. The increase in solids content may thus be higher than approximately 30% when using a graphene-to-resin ratio <5.

Example 18

Figures 29, 30:
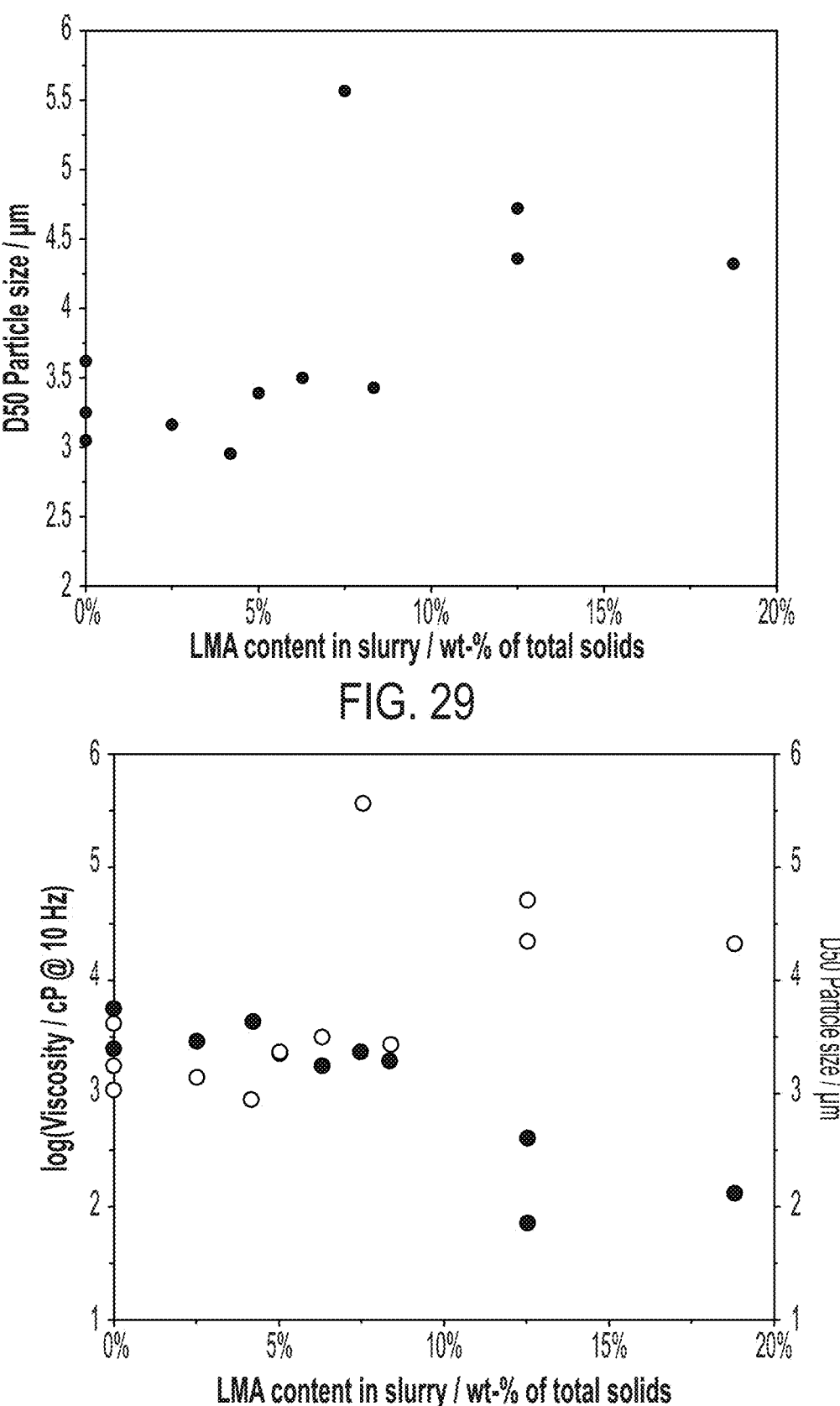
FIG. 29 is a graph of D50 particle size versus lauryl methacrylate content in a slurry as a weight percentage of the total solids within the slurry.
FIG. 30 is a graph of viscosity and D50 particle size versus lauryl methacrylate content in the slurry as a weight percentage of the total solids within the slurry.
Figure 31:
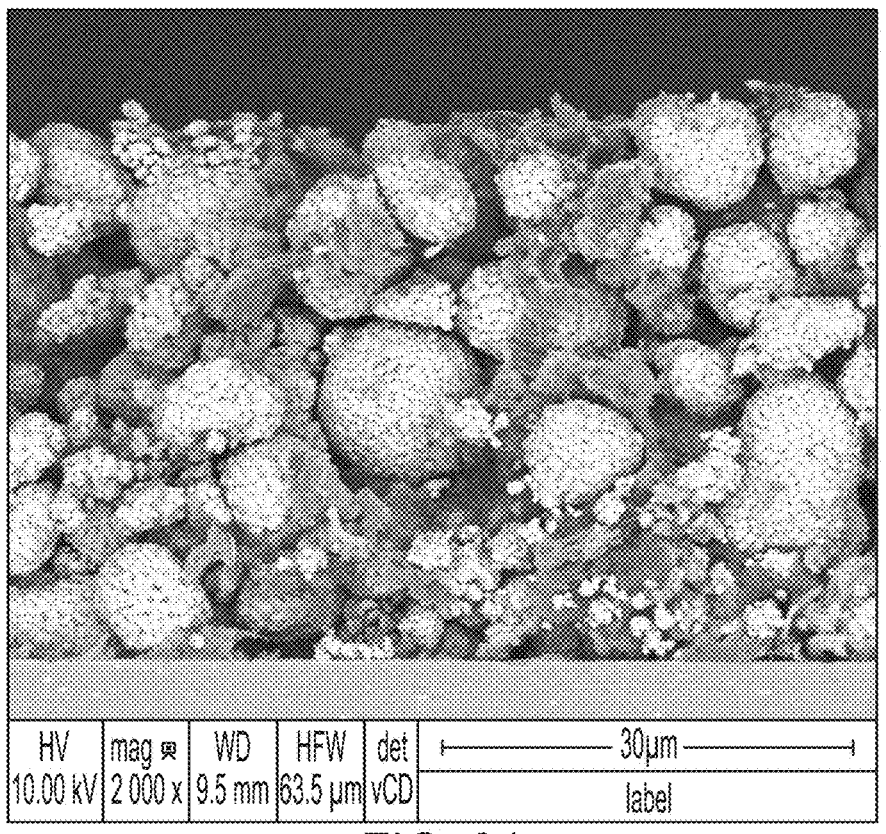
FIGS. 31-38 are scanning electron microscope images of Li-ion cathode films produced with graphenic carbon nanoparticle dispersions.
Figure 32:
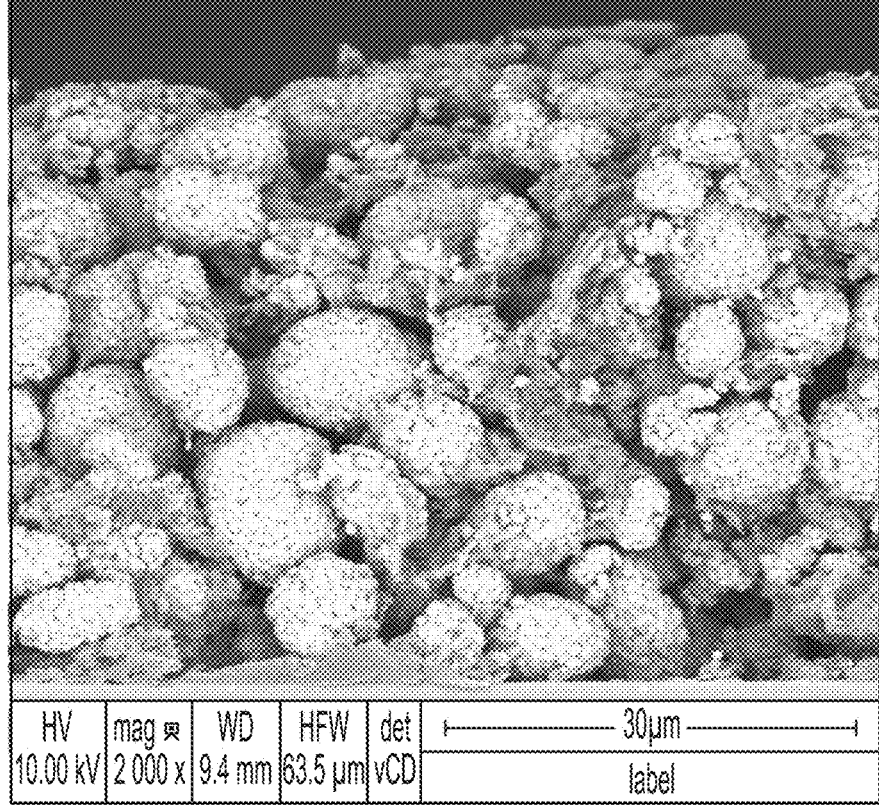
Figure 33:
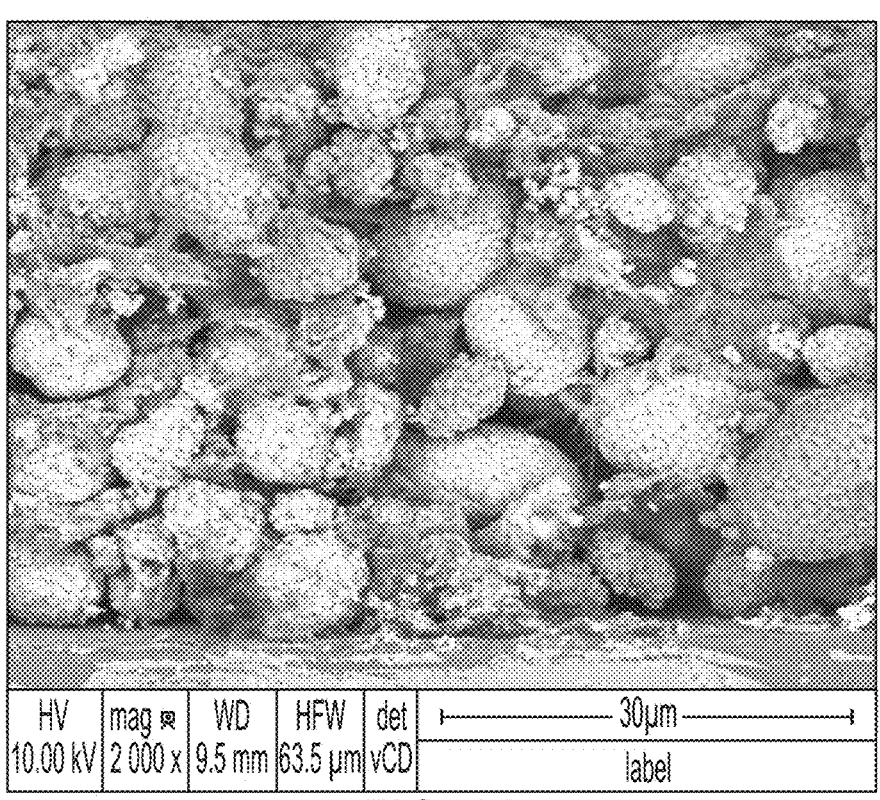
Figure 34:
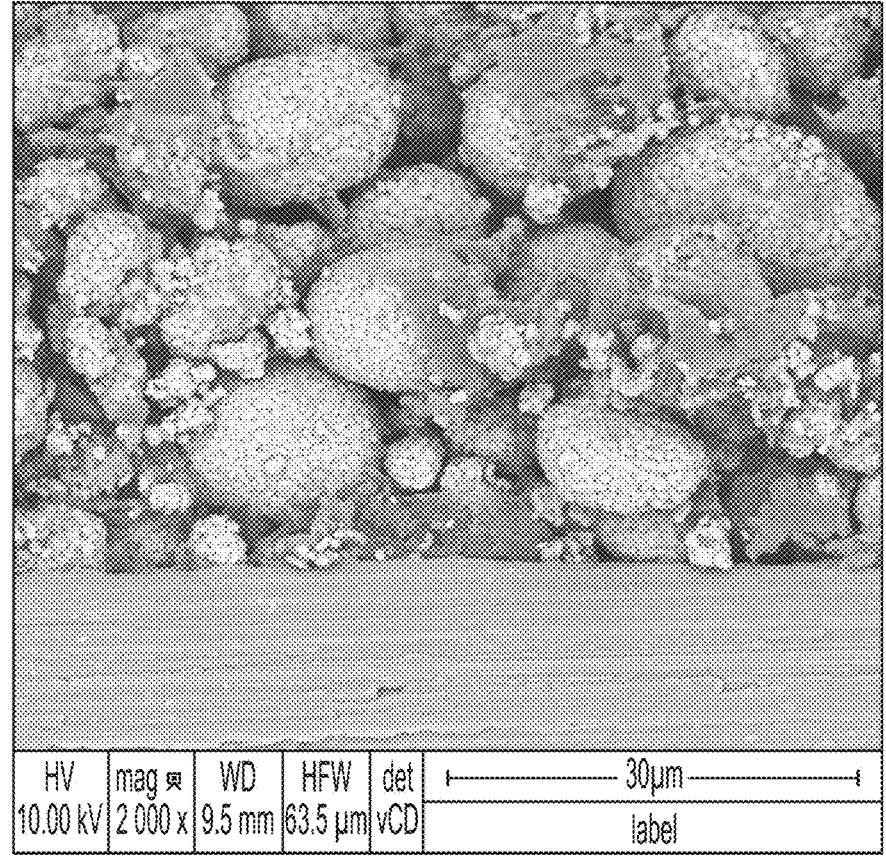
Figure 35:
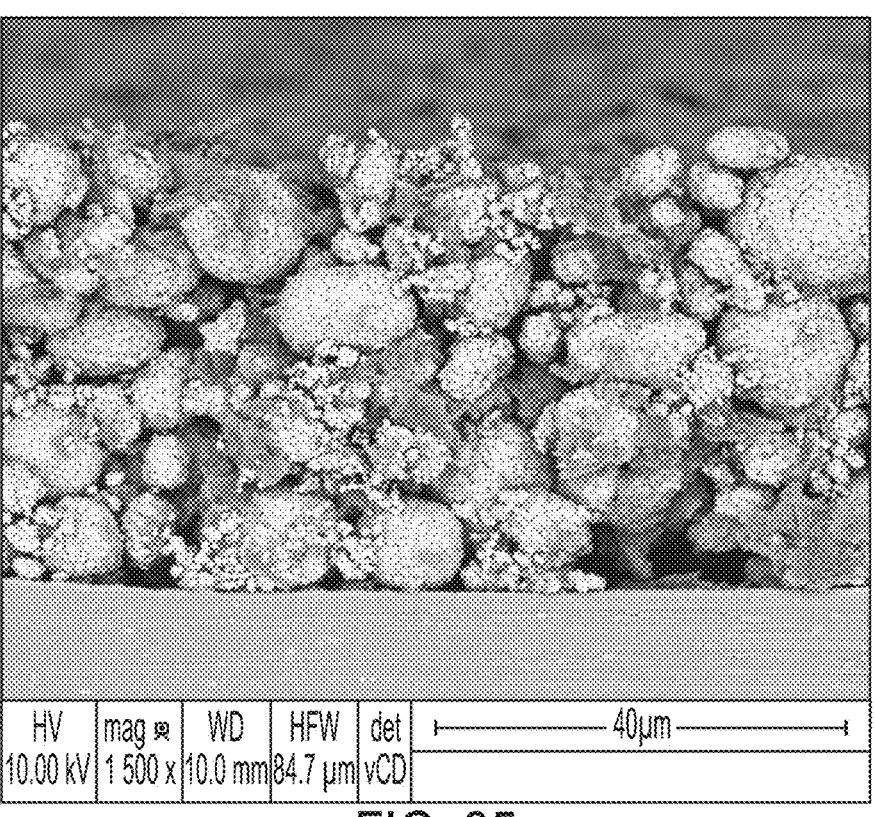
Figure 36:
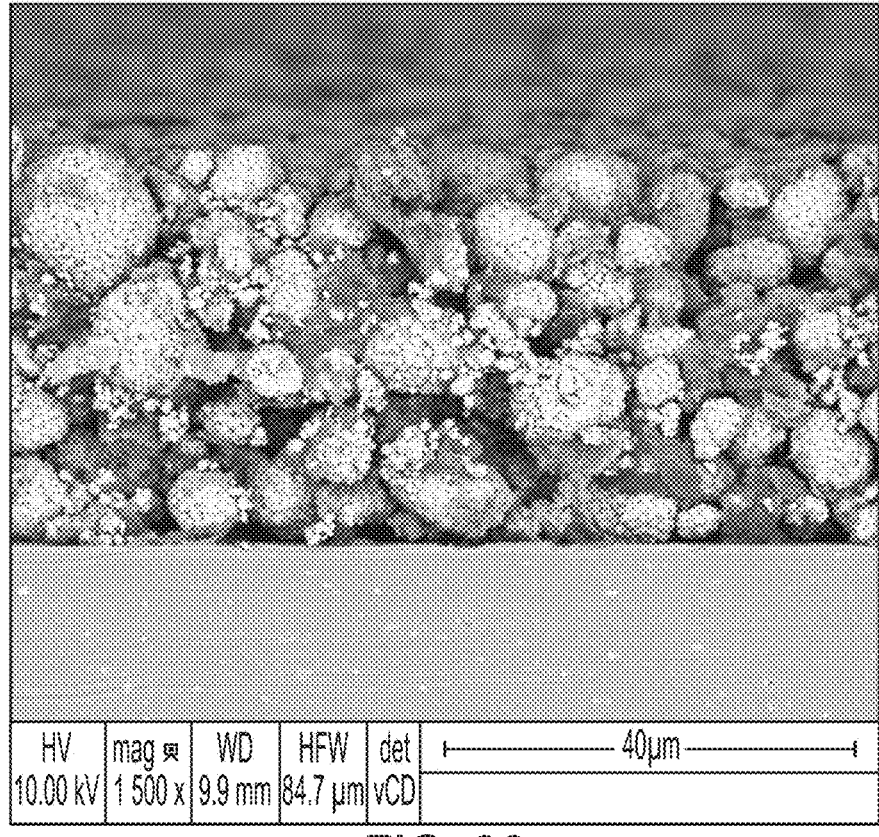
Figure 37:
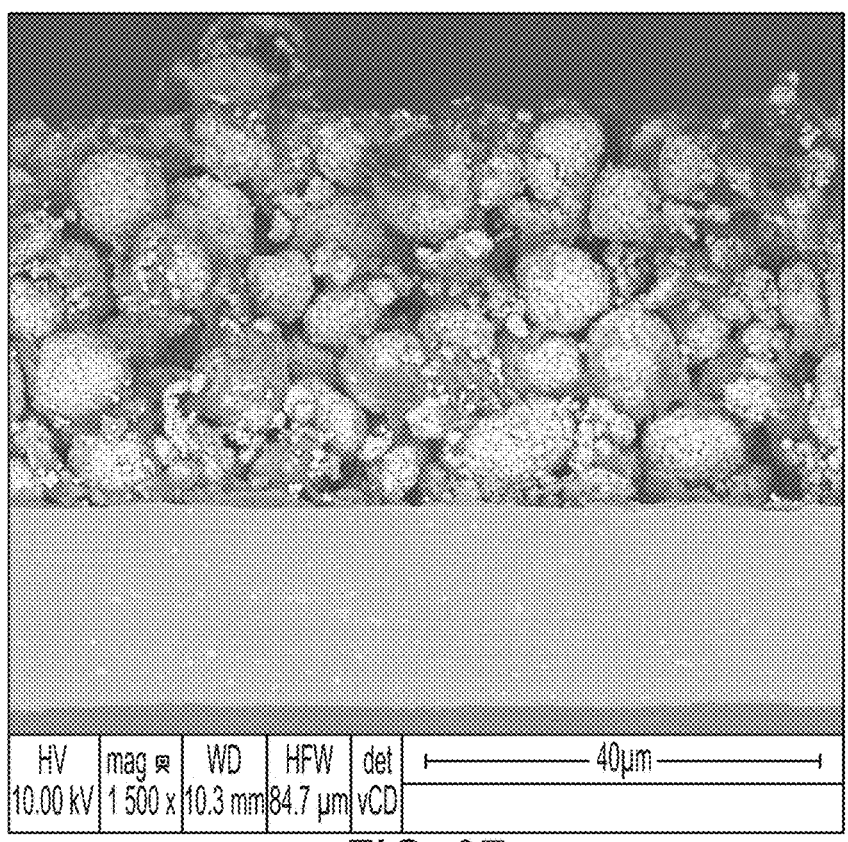
Figure 38:
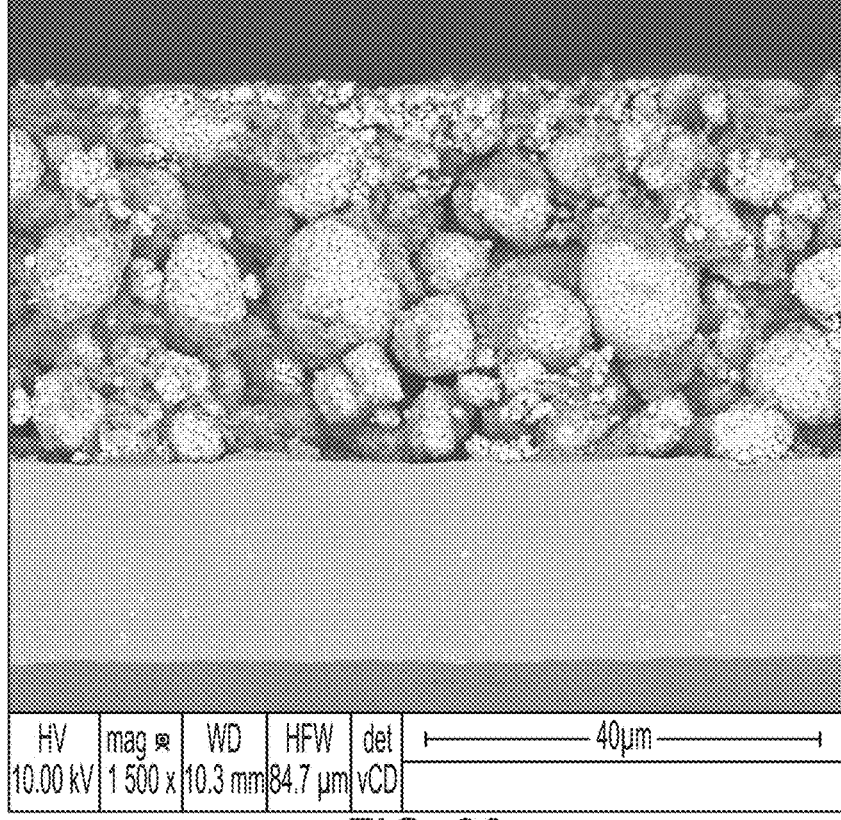

In order to determine the increased solids content attainable with a resin containing high amounts of lauryl methacrylate, graphenic carbon dispersions were formulated at different total solids content but a constant graphenic carbon nanoparticle-to-resin ratio of 5. Graphenic carbon nanoparticle dispersions are composed as listed in Table 16. FIGS. 29 and 30 demonstrate that an increase of total solids of up to and including approximately 30% can be achieved when using Resin 3 in replacement of PVP in an NMP-based graphenic carbon nanoparticle dispersion while maintaining similar viscosity at identical shear rates when a graphene-to-resin ratio of 5 is employed.

TABLE 16

GNP Dispersions in NMP with PVP or Resin 3

| Component | Dispersion A (wt-%) | Dispersion B (wt-%) | Dispersion C (wt-%) |
|---|---|---|---|
| NMP* | 94.0 | 94.0 | 92.0 |
| GNP | 5.0 | 5.0 | 6.7 |
| PVP** | 1.0 | — | — |
| Resin 3*** | — | 1.0 | 1.3 |

*NMP, N-vinylpyrrolidone, CAS#872-50-4, Anhydrous, 99.5%, Sigma Aldrich.
**PVP, Polyvinylpyrrolidone, CAS# 9003-39-8, Mw = 10,000 g/mol, Sigma Aldrich
***Resin 3-A copolymer of lauryl methacrylate and N-vinyl pyrrolidone, P(LMA-co-VP) at a ratio of 3-to-1 respectively dispersed in NMP, Mw = ~35,000 g/mol

Example 19

In order to test the electrochemical stability of the dispersant when used in a Li-ion cathode film, graphenic carbon nanoparticle dispersions listed above were used in a Li-ion cathode slurry formulation under a $N_2$ blanket composed of the components listed in Table 17. In a speedmixer dispersion, the graphenic carbon nanoparticle dispersion was added with ½ of the desired $LiNi_{0.5}Mn_{0.3}CO_{0.2}O_2$ active material and mixed for 30 seconds at 2000 rpm. The other ½ of the desired $LiNi_{0.5}Mn_{0.3}CO_{0.2}O_2$ active material was then added and mixed for a total of 60 seconds at 2000 rpm using 2×30 second incremental mixing steps. Separately and prior to addition of poly (vinylidene fluoride) (PVDF) to the Li-ion cathode slurry, PVDF was dissolved in NMP to make an 8 wt-% solution. The resulting PVDF solution was then added to the Li-ion cathode slurry containing $LiNi_{0.5}Mn_{0.3}CO_{0.2}O_2$ and graphenic carbon nanoparticle dispersion and mixed for 30 seconds at 2000 rpm. The remaining quantity of NMP was then added to the slurry and mixed in 30 second increments at 2000 rpm until thoroughly mixed, typically mixing for a total time ranging from as low as 2 minutes to as high as 6 minutes. Films were then cast onto an aluminum foil substrate using a doctor blade method at a rate of 10 mm per second, then cured at 55° C. for 2 minutes, followed by a second cure step at 120° C. for 2 minutes. Films were then calendar pressed to the desired porosity of approximately 25-35% porosity. FIGS. 31-38 show scanning electron microscope images of the final Li-ion cathode films as a cross-section of the film. These images show a relatively uniform distribution of the graphenic carbon nanoparticles and binder throughout the network of larger secondary particles of the $LiNi_{0.5}Mn_{0.3}CO_{0.2}O_2$ particles.

TABLE 17

Li-ion cathode slurry components

| Component | Weight percent (%) |
|---|---|
| $LiNi_{0.5}Mn_{0.3}Co_{0.2}O_2$ | 45 |
| GNP dispersion* | 29 |
| PVDF** | 1 |
| NMP*** | 25 |

*GNP dispersion described in Example 8 Dispersion A and Dispersion B, Example 9 Dispersion A and Dispersion B, Example 10 Dispersion A and Dispersion B, and Example 11 Dispersion A and Dispersion B.
**PVDF-Poly(vinylidene fluoride), Solvay Solef® 5130, Mw = 1,000,000-1,100,000 g/mol
***NMP, N-vinylpyrrolidone, CAS#872-50-4, Anhydrous, 99.5%, Sigma Aldrich.

Example 20

In order to test the electrochemical stability of the dispersant when used in a Li-ion cathode film, coin cells of films described in Example 19 were assembled in a VAC Atmospheres Nexus II glovebox under argon with an oxygen level <2 ppm and a $H_2O$ level <0.5 ppm. Prior to coin cell fabrication, films were punched out into 1 $cm^2$ sections for coin cell fabrication and dried under vacuum at 110° C. for 10 hours, then brought directly into the glovebox without any exposure to outside atmosphere. 2032 coin cells were used for fabrication, lithium metal was used as the counter electrode and reference electrode, and Celgard 2320 polypropylene/polyethyelene/polypropylene (PP/PE/PP) was used as a separator. 75 μL of a 1 M $LiPF_6$ solution dissolved in a 3:7 ratio of ethylene carbonate/ethyl methyl carbonate with 2 wt-% vinylene carbonate additive was used as the electrolyte. Coin cells were charged and discharged using a Bio-Logic BCS-805 or BCS-810 Battery Cycler between 3.0 and 4.3 V vs Li at various rates described in Table 18, in order from top to bottom, for a total of 50 cycles.

TABLE 18

| Charge/Discharge rates of Li-ion coin cells | |
| --- | --- |
| Charge/Discharge C-rate | Number of cycles |
| 0.1 C | 3 |
| 0.2 C | 3 |
| 0.4 C | 3 |
| 0.8 C | 3 |
| 1.6 C | 3 |
| 1.0 C | 35 |

Figure 39:
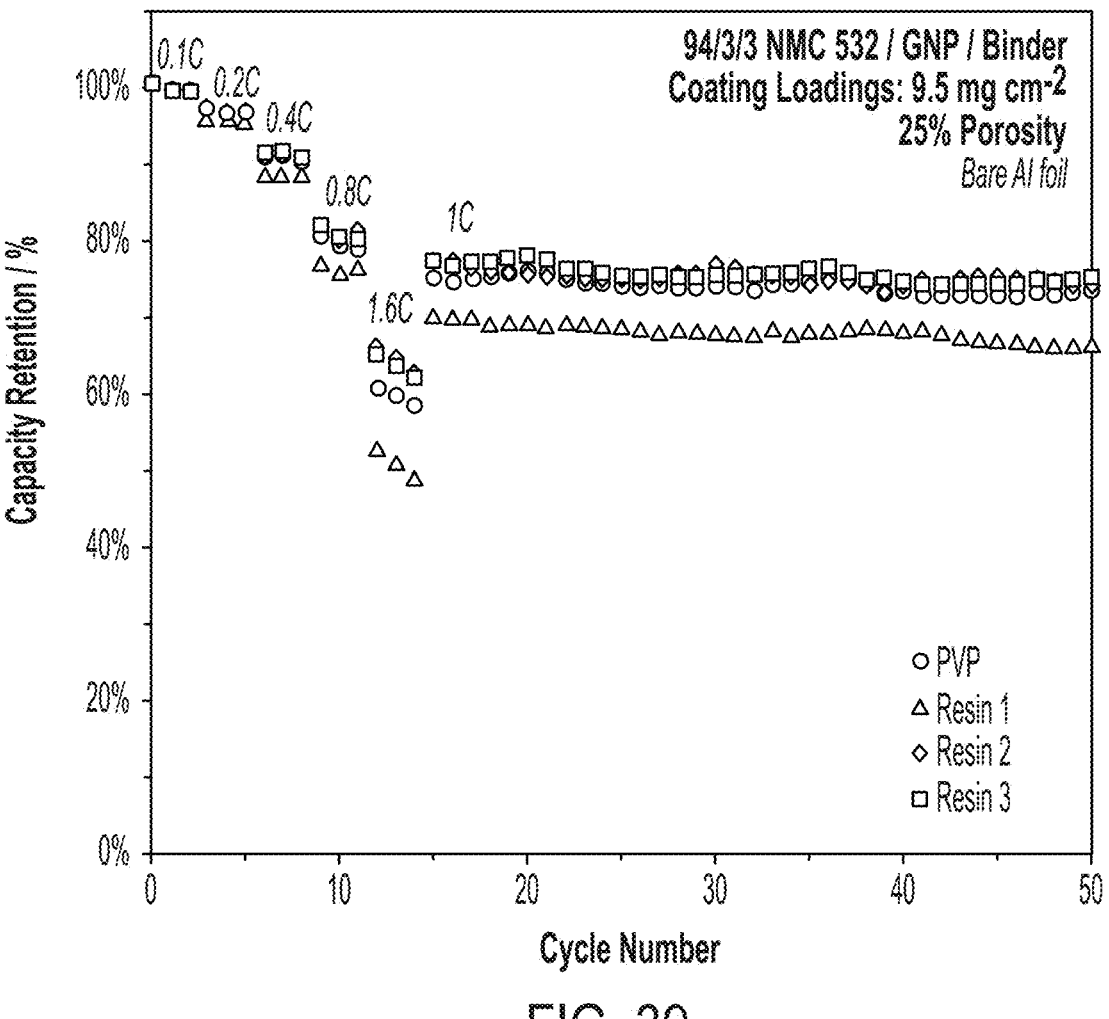
FIG. 39 is a graph of capacity retention versus cycle number at various C-rates for Li-ion cathode films produced with graphenic carbon nanoparticle dispersions.
Figure 40:
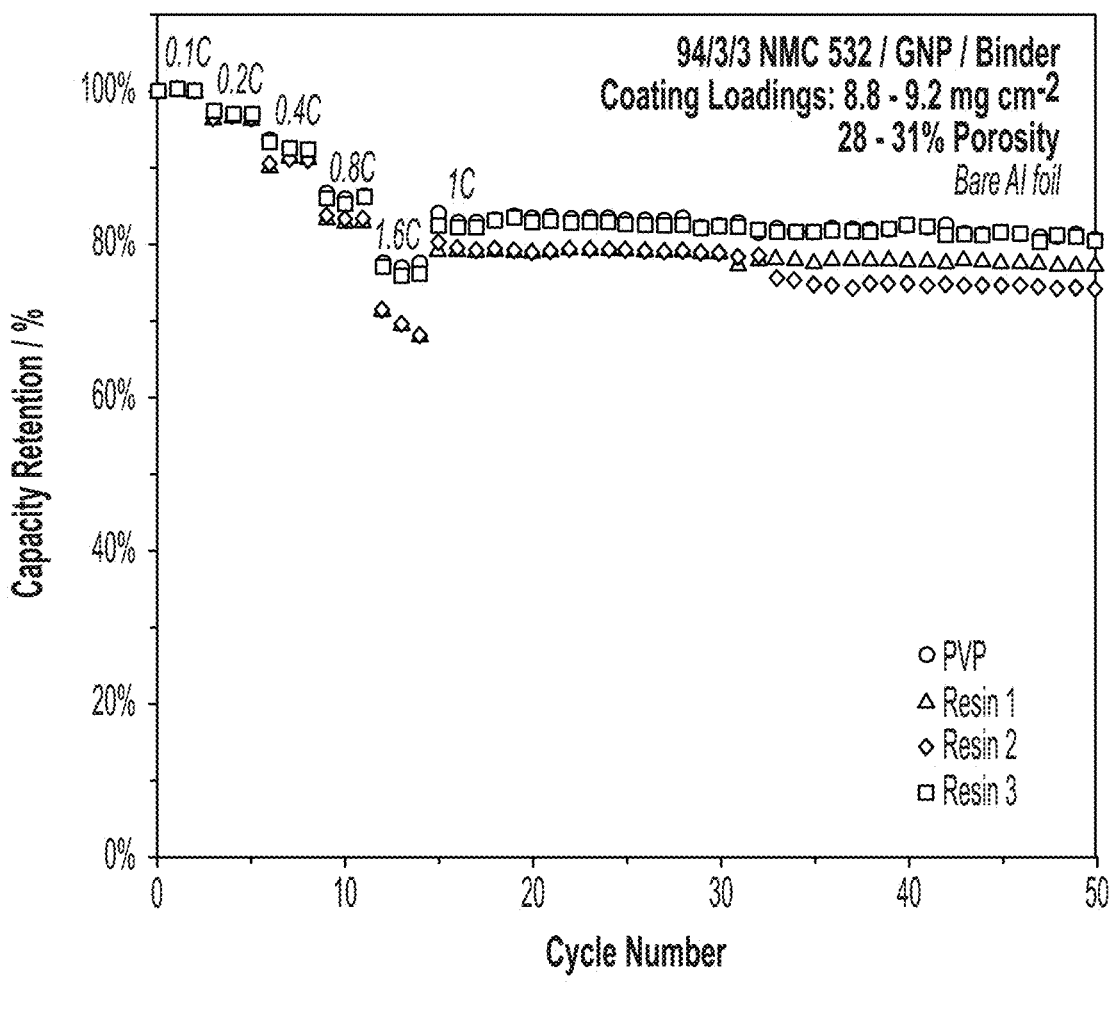
FIG. 40 is a graph of capacity retention versus cycle number at various C-rates for Li-ion cathode films produced with graphenic carbon nanoparticle dispersions.

As is observed in FIGS. 39 and 40, there appears to be little to no effect on capacity retention and cycle life when the lauryl methacrylate content is increased from 0-75% of the graphenic carbon nanoparticle dispersant either at a graphenic carbon nanoparticle-to-resin ratio of 9 or 5. These results assure that the graphenic carbon nanoparticle dispersant responsible for a decrease in viscosity of the graphenic carbon nanoparticle dispersion is capable of being used in a Li-ion cathode electrode with minimal influence on the performance of the cell in a coin cell format, with the most impact on rate capability at 1.6 C versus the Example 10 Dispersion A and B control (containing no lauryl methacrylate in the graphenic carbon nanoparticle dispersion resin) coming from Example 11 Dispersion A and B, the dispersion with the highest lauryl methacrylate content.

Example 21

Dispersant resins with a random copolymer architecture comprising lauryl acrylate and N-vinylpyrrolidone monomers were produced using free radical polymerization chemistry. In a typical preparation, Solvesso 200 (23.15 grams) was charged to a reactor and heated to 110° C. under a constant nitrogen atmosphere. A mixture of Solvesso 200 (3.56 grams) and free radical initiator tertiary amyl peroxy 2-ethylhexyl carbonate (0.46 grams) was then added dropwise to the reactor from the initiator feed tank over 185 minutes. Five minutes after beginning the charging of the free radical initiator solution, a mixture of lauryl acrylate (26.25 grams) and N-vinylpyrrolidone (8.75 grams) was added to the reactor over 180 minutes from the monomer feed tank. After completing the free radical initiator and monomer feeds, the monomer feed tank was rinsed with Solvesso 200 (3.56 grams) and the solution was added to the reactor. From the initiator tank, a mixture of Solvesso 200 (3.56 grams) and tertiary amyl peroxy 2-ethylhexyl carbonate (0.15 grams) was added to the reactor over 60 minutes. The initiator feed tank was rinsed with Solvesso 200 (1.78 grams) and the solution was added to the reactor. The reaction was then held at a constant temperature of 110° C. for 60 minutes.

Example 22

Dispersant resins with a random copolymer architecture comprising lauryl methacrylate and N-vinylpyrrolidone monomers were produced using free radical polymerization chemistry. In a typical preparation, Solvesso 200 (20.00 grams) was charged to a reactor and heated to 120° C. under a constant nitrogen atmosphere. A mixture of Solvesso 200

(3.60 grams) and free radical initiator tertiary amyl peroxy 2-ethylhexyl carbonate (0.44 grams) was added dropwise to the reactor from the initiator feed tank over 185 minutes. Five minutes after beginning the charging of the free radical initiator solution, a mixture of lauryl methacrylate (24.50 grams) and N-vinylpyrrolidone (10.50 grams) was added to the reactor over 180 minutes from the monomer feed tank. After completing the free radical initiator and monomer feeds, the monomer feed tank was rinsed with Solvesso 200 (4.80 grams) and the solution was added to the reactor. From the initiator tank, a mixture of Solvesso 200 (1.20 grams) and tertiary amyl peroxy 2-ethylhexyl carbonate (0.15 grams) was added to the reactor over 60 minutes. The reaction solution was then held at 120° C. for 30 minutes. From the initiator tank, a mixture of Solvesso 200 (1.20 grams) and tertiary amyl peroxy 2-ethylhexyl carbonate (0.15 grams) was added to the reactor over 60 minutes. The initiator feed tank was rinsed with Solvesso 200 (1.65 grams) and the solution was added to the reactor. The reaction was then held at a constant temperature of 120° C. for 60 minutes.

Example 23

Dispersant resins with a random copolymer architecture comprising stearyl acrylate and N-vinylpyrrolidone monomers were produced using free radical polymerization chemistry. In a typical preparation, Solvesso 200 (13.15 grams) was charged to a reactor and heated to 110° C. under a constant nitrogen atmosphere. A mixture of Solvesso 200 (3.56 grams) and free radical initiator tertiary amyl peroxy 2-ethylhexyl carbonate (0.46 grams) was then added dropwise to the reactor from the initiator feed tank over 185 minutes. Five minutes after beginning the charging of the free radical initiator solution, a mixture of stearyl acrylate (26.25 grams) and N-vinylpyrrolidone (8.75 grams), heated at 45° C. to afford compatibility, was added to the reactor over 180 minutes from the monomer feed tank. After completing the free radical initiator and monomer feeds, the monomer feed tank was rinsed with Solvesso 200 (1.56 grams) and the solution was added to the reactor. From the initiator tank, a mixture of Solvesso 200 (3.56 grams) and tertiary amyl peroxy 2-ethylhexyl carbonate (0.15 grams) was added to the reactor over 60 minutes. The initiator feed tank was rinsed with Solvesso 200 (1.78 grams) and the solution was added to the reactor. The reaction was then held at a constant temperature of 110° C. for 60 minutes.

Example 24

Dispersant resins with a random copolymer architecture comprising stearyl methacrylate and N-vinylpyrrolidone monomers were produced using free radical polymerization chemistry. In a typical preparation, Solvesso 200 (23.15 grams) was charged to a reactor and heated to 110° C. under a constant nitrogen atmosphere. A mixture of Solvesso 200 (3.87 grams) and free radical initiator tertiary amyl peroxy 2-ethylhexyl carbonate (0.50 grams) was then added dropwise to the reactor from the initiator feed tank over 185 minutes. Five minutes after beginning the charging of the free radical initiator solution, a mixture of stearyl methacrylate (26.25 grams) and N-vinylpyrrolidone (8.75 grams) was added to the reactor over 180 minutes from the monomer feed tank. After completing the free radical initiator and monomer feeds, the monomer feed tank was rinsed with Solvesso 200 (3.56 grams) and the solution was added to the reactor. From the initiator tank, a mixture of Solvesso 200

(3.56 grams) and tertiary amyl peroxy 2-ethylhexyl carbonate (0.15 grams) was added to the reactor over 60 minutes. The initiator feed tank was rinsed with Solvesso 200 (1.78 grams) and the solution was added to the reactor. The reaction was then held at a constant temperature of 110° C. for 60 minutes.

Example 25

Dispersant resins with a random copolymer architecture comprising stearyl acrylate and N-vinylpyrrolidone monomers were produced using free radical polymerization chemistry. In a typical preparation, N-amyl propionate (18.18 grams) was charged to a reactor and heated to 120° C. under a constant nitrogen atmosphere. A mixture of N-amyl propionate (3.66 grams) and free radical initiator tertiary amyl peroxy 2-ethylhexyl carbonate (0.35 grams) was then added dropwise to the reactor from the initiator feed tank over 185 minutes. Five minutes after beginning the charging of the free radical initiator solution, a mixture of stearyl acrylate (22.05 grams), N-vinylpyrrolidone (9.45 grams), and Solvesso 200 (4.50 grams) was added to the reactor over 180 minutes from the monomer feed tank. After completing the free radical initiator and monomer feeds, the monomer feed tank was rinsed with N-amyl propionate (1.80 grams) and the solution was added to the reactor. From the initiator tank, a mixture of N-amyl propionate (1.22 grams) and tertiary amyl peroxy 2-ethylhexyl carbonate (0.12 grams) was added to the reactor over 60 minutes. The initiator feed tank was rinsed with N-amyl propionate (2.25 grams) and the solution was added to the reactor. The reaction was then held at a constant temperature of 120° C. for 60 minutes.

Example 26

Dispersant resins with a block copolymer architecture comprising stearyl acrylate and N-vinylpyrrolidone monomers were produced using reversible addition-fragmentation chain transfer (RAFT) polymerization. In a typical preparation, N-amyl propionate (70.2 grams), 2-cyanobutan-2-yl 4-chloro-3,5-dimethyl-1H-pyrazole-1-carbodithioate (BM1565) (2.0724 grams) and stearyl acrylate (100.8 grams) were charged to a reactor and heated to 85° C. under a constant nitrogen atmosphere (blanket and sparge). A mixture of N-amyl propionate (27.4 grams) and free radical initiator 2,2'-Azobis(2-methylbutyronitrile) (0.2769 grams) was sparged with nitrogen for 15 minutes and then added dropwise to the reactor over 120 minutes. After completing the free radical initiator feed the reaction was held at a constant temperature of 85° C. for 60 minutes. Subsequently, a mixture of N-vinylpyrrolidone (43.2 grams) and N-amyl propionate (21.6 grams) was sparged with nitrogen for 15 minutes and then added dropwise to the reactor over 30 minutes. A mixture of N-amyl propionate (27.4 grams) and free radical initiator 2,2'-Azobis(2-methylbutyronitrile) (0.2769 grams) was sparged with nitrogen for 15 minutes and then added dropwise to the reactor over 120 minutes. After completing the free radical initiator feed the reaction was held at a constant temperature of 85° C. for 150 minutes.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about," even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on," "onto," "applied on," "applied onto," "formed on," "deposited on," "deposited onto," mean formed, overlaid, deposited, or provided on but not necessarily in contact with the surface. For example, an electrodepositable coating composition "deposited onto" a substrate does not preclude the presence of one or more other intervening coating layers of the same or different composition located between the electrodepositable coating composition and the substrate.

Whereas particular embodiments of this invention have been described above for purposes of illustration, it will be evident to those skilled in the art that numerous variations of the details of the present invention may be made without departing from the invention as defined in the appended claims.

What is claimed is:

1. A dispersion comprising:
an organic solvent comprising N-methyl-2-pyrrolidone;
graphenic carbon nanoparticles;
a polymeric dispersant resin comprising an addition polymer comprising a homopolymer, a block (co)polymer, a random (co)polymer, an alternating (co)polymer, a graft (co)polymer, a brush (co)polymer, a star (co)polymer, a telechelic (co)polymer, or a combination thereof; wherein the addition polymer comprises a residue of an alkyl ester of (meth)acrylic acid containing from 8 to 22 carbon atoms in the alkyl group.

2. The dispersion of claim 1, wherein the dispersion has an instability index of less than 0.5.

3. The dispersion of claim 1, wherein the graphenic carbon nanoparticles are present in the dispersion in an amount greater than 3 weight percent based on the total weight of the dispersion.

4. The dispersion of claim 3, wherein the instability index is less than 0.3.

5. The dispersion of claim 1, wherein the alkyl ester of (meth)acrylic acid containing from 8 to 22 carbon atoms in the alkyl group comprises lauryl methacrylate or stearyl acrylate.

6. The dispersion of claim 1, wherein the addition polymer further comprises a residue of a vinyl heterocyclic amide comprising vinyl pyrrolidone or polyvinyl pyrrolidone.

7. The dispersion of claim 1, wherein the graphenic carbon nanoparticles have an average aspect ratio of greater than 3:1 and a Raman 2D:G peak ratio of at least 1:1.

8. The dispersion of claim 7, wherein the graphenic carbon particles have a B.E.T. specific surface area of at least 70 square meters per gram.

9. The dispersion of claim 1, wherein the graphenic carbon nanoparticles are thermally produced at a temperature of at least 3,500° C.

10. The dispersion of claim 9, wherein the graphenic carbon nanoparticles are turbostratic and comprise 4 or more stacked layers.

11. The dispersion of claim 1, wherein the graphenic carbon nanoparticles are milled.

12. The dispersion of claim 1, wherein a weight ratio of the graphenic carbon nanoparticles to the dispersant resin is from 0.5:1 to 15:1.

13. A lithium ion battery electrode comprising:

a lithium-containing active material or lithium-reactive particles; and the dispersion of claim 1.

14. A method of dispersing graphenic carbon nanoparticles in an organic solvent comprising:

mixing a dispersant resin into the solvent to form a mixture, wherein the solvent comprises N-methyl-2-pyrrolidone, and wherein the dispersant resin comprises an addition polymer comprising the residue of a vinyl heterocyclic amide, an addition polymer comprising a homopolymer, a block (co)polymer, a random (co)polymer, an alternating (co)polymer, a graft (co) polymer, a brush (co)polymer, a star (co)polymer, a telechelic (co)polymer, or a combination thereof; wherein the addition polymer comprises a residue of an alkyl ester of (meth)acrylic acid containing from 8 to 22 carbon atoms in the alkyl group; and mixing the graphenic carbon nanoparticles into the solvent and dispersant resin mixture.

15. The method of claim 14, further comprising milling the graphenic carbon nanoparticles prior to the mixing of the graphenic carbon nanoparticles into the solvent and dispersant resin mixture.

16. The method of claim 14, wherein the graphenic carbon nanoparticles have an average aspect ratio of greater than 3:1 and a Raman 2D:G peak ratio of at least 1:1.

\* \* \* \* \*